(12) United States Patent
Hirose

(10) Patent No.: US 8,730,347 B2
(45) Date of Patent: May 20, 2014

(54) IMAGE PICKUP APPARATUS WITH FOCUS DETECTION

(75) Inventor: Minoru Hirose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 13/260,542

(22) PCT Filed: May 7, 2010

(86) PCT No.: PCT/JP2010/003127
§ 371 (c)(1),
(2), (4) Date: Sep. 26, 2011

(87) PCT Pub. No.: WO2010/131444
PCT Pub. Date: Nov. 18, 2010

(65) Prior Publication Data
US 2012/0026358 A1      Feb. 2, 2012

(30) Foreign Application Priority Data

May 11, 2009   (JP) .................................. 2009-114639

(51) Int. Cl.
*H04N 9/73*         (2006.01)
*G03B 13/00*        (2006.01)

(52) U.S. Cl.
USPC ...................................... 348/226.1; 348/349

(58) Field of Classification Search
USPC ........ 348/362, 345, 221.1, 226.1, 229.1, 349, 348/230.1
See application file for complete search history.

(56) References Cited

U.S. PATENT DOCUMENTS

| 6,819,360 | B1 | 11/2004 | Ide et al. ...................... 348/340 |
| 6,829,008 | B1 | 12/2004 | Saga et al. .................... 348/302 |
| 7,589,764 | B2 * | 9/2009 | Nakata et al. ............. 348/227.1 |
| 7,995,112 | B2 * | 8/2011 | Kinoshita et al. .......... 348/226.1 |
| 8,218,962 | B2 * | 7/2012 | Fujii et al. .................... 396/100 |
| 2006/0055813 | A1 | 3/2006 | Nakata et al. ................. 348/345 |
| 2009/0148147 | A1 * | 6/2009 | Fujii et al. .................... 396/128 |

FOREIGN PATENT DOCUMENTS

| JP | 2000-156823 | 6/2000 |
| JP | 2000-292686 | 10/2000 |
| JP | 2006-084556 | 3/2006 |
| JP | 2006-146058 | 6/2006 |
| JP | 2008-224808 | 9/2008 |

OTHER PUBLICATIONS

International Search Report and Written Opinion dated Jun. 22, 2010 in counterpart PCT Application No. PCT/JP2010/003127.

* cited by examiner

*Primary Examiner* — Ahmed A Berhan
(74) *Attorney, Agent, or Firm* — Fitzpatrick, Cella, Harper & Scinto

(57) ABSTRACT

An image pickup apparatus of the present invention includes an image pickup element having imaging pixels and focus detection pixels, and configured to read a signal for which a photoelectric conversion has been performed in a first direction, a focus detector capable of detecting a focus state using a phase difference of a pair of images in the first direction and a pair of images in a second direction based on outputs of the focus detecting pixels, a flicker reduction portion configured to reduce the flicker, and a controller configured to control a focal point in accordance with the focus state obtained from a phase difference of the pair of images in the first direction before an operation of the flicker reduction portion.

4 Claims, 22 Drawing Sheets

READING ALL PIXELS

TIMING CHART OF READING ALL PIXELS

READING PARTIAL PIXELS

TIMING CHART OF READING PARTIAL PIXELS

PLAN VIEW

A-A CROSS SECTION

PLAN VIEW

A-A CROSS SECTION

Fig. 9B

| BLOCK_H(0,0) | BLOCK_V(0,0) | BLOCK_H(2,0) | BLOCK_V(1,0) |
|---|---|---|---|
| BLOCK_V(0,1) | BLOCK_H(1,0) | BLOCK_V(1,1) | BLOCK_H(3,0) |
| BLOCK_H(0,1) | BLOCK_V(0,2) | BLOCK_H(2,1) | BLOCK_V(1,2) |
| BLOCK_V(0,3) | BLOCK_H(1,1) | BLOCK_V(1,3) | BLOCK_H(3,1) |

A

HORIZONTAL
PROJECTION Ah

B

HORIZONTAL
PROJECTION Bh

Fig. 16B]
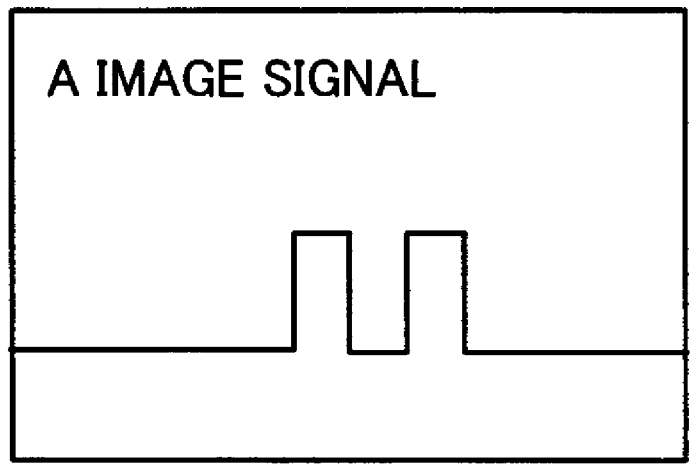
Fig. 16C
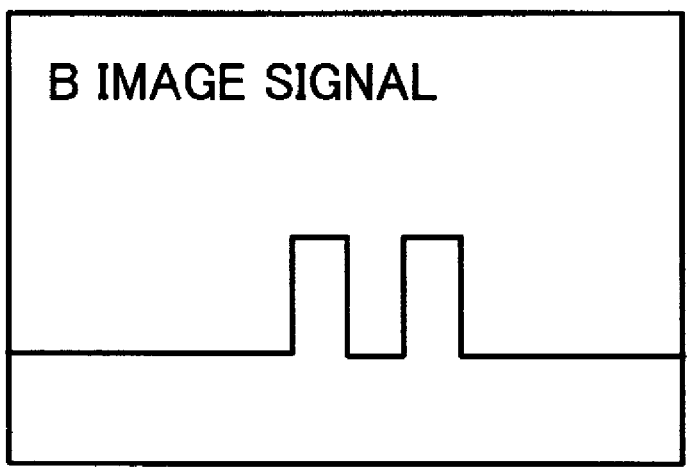
Fig. 16D
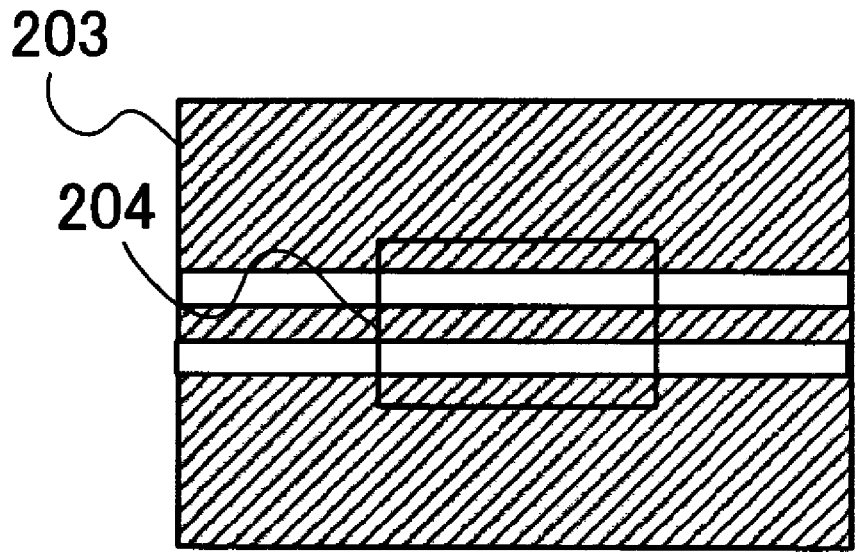

IMAGE PICKUP APPARATUS WITH FOCUS DETECTION

TECHNICAL FIELD

The present invention relates to an image pickup apparatus capable of performing autofocus detection.

BACKGROUND ART

Previously, there has been an image pickup apparatus having a function of a live view mode. In the live view mode, an object image can be confirmed by sequentially outputting image signals continuously read out of a solid-state image pickup element such as a CCD or a CMOS sensor to a display device such as a liquid crystal display.

Patent Literatures 1 and 2 disclose a configuration where phase difference focus detection is performed by arranging focus detection pixels where pupil division function is given to a part of light receiving elements (pixels) of an image pickup element between imaging pixels at predetermined intervals. Since the area where the focus detection pixels are arranged corresponds to a defect part of the imaging pixel, Patent Literatures 1 and 2 disclose generating image information by performing an interpolation based on peripheral imaging pixel information.

In the image pickup apparatus having the image pickup element such as a CMOS sensor, a rolling electronic shutter which reads a screen every line is used. Therefore, when the live view mode is functioned by using the image pickup apparatus, there is a problem that a horizontal-striped flicker (a line flicker) is generated in an imaging screen. The flicker is generated depending on an accumulation time of the image pickup element, a frame frequency of the image pickup element, and an alternate lighting cycle of a fluorescent when a moving image of an object is displayed or recorded under a light source directly lighted by using a commercial power source such as under the illumination of the fluorescent. When the accumulation time of the image pickup element is set so as to be an integral multiple of the lighting cycle of the fluorescent to align an exposure amount every line, the influence of the flicker can be reduced.

However, a dedicated control is necessary for both cases of an area flicker and the line flicker. Therefore, it is necessary to detect the existence or nonexistence of the flicker at a certain timing to control the flicker in accordance with the detection result (flicker elimination mode). Patent Literature 3 discloses a method of performing highly-accurate autofocus detection by reducing the influence of the flicker.

CITATION LIST

Patent Literature

[PTL 1] Japanese Patent Laid-open No. 2000-156823
[PTL 2] Japanese Patent Laid-open No. 2000-292686
[PTL 3] Japanese Patent Laid-open No. 2006-84556

SUMMARY OF INVENTION

Technical Problem

However, in Patent Literature 3, because the autofocus detection is performed after detecting the flicker, high-speed focus detection cannot be performed before detecting the flicker. The present invention provides an image pickup apparatus capable of performing high-speed autofocus detection without being influenced by a flicker.

Solution to Problem

An image pickup apparatus as one aspect of the present invention includes an image pickup element having a plurality of imaging pixels configured to perform a photoelectric conversion of an image formed by a light beam from an image pickup optical system and a plurality of focus detection pixels configured to perform a photoelectric conversion of an image formed by divided light beams of the light beam from the image pickup optical system, and configured to read a signal for which a photoelectric conversion has been performed in a first direction, a focus detector capable of detecting a focus state of the image pickup optical system using a phase difference of at least a pair of images in the first direction and a pair of images in a second direction different from the first direction, based on outputs of the focus detecting pixels, a flicker reduction portion configured to reduce the flicker, and a controller configured to control a focal point of the image pickup optical system in accordance with the focus state of the image pickup optical system obtained from a phase difference of the pair of images in the first direction before performing an operation of the flicker reduction portion.

Further features and aspects of the present invention will become apparent from the following description of exemplary embodiments with reference to the attached drawings.

Advantageous Effects of Invention

According to the present invention, an image pickup apparatus capable of performing high-speed autofocus detection without being influenced by a flicker can be provided.

BRIEF DESCRIPTION OF DRAWINGS

FIG. 9B is an arrangement of focus detection pixels for detecting vertical and horizontal lines in the present embodiment.

FIG. 16B is a diagram showing an A image signal of an object imaged in a field angle area of an image pickup element in the present embodiment.

FIG. 16C is a diagram showing a B image signal of an object imaged in a field angle area of an image pickup element in the present embodiment.

FIG. 16D is a diagram showing an object imaged in a field angle area of an image pickup element in the present embodiment.

DESCRIPTION OF EMBODIMENTS

Figure 1:
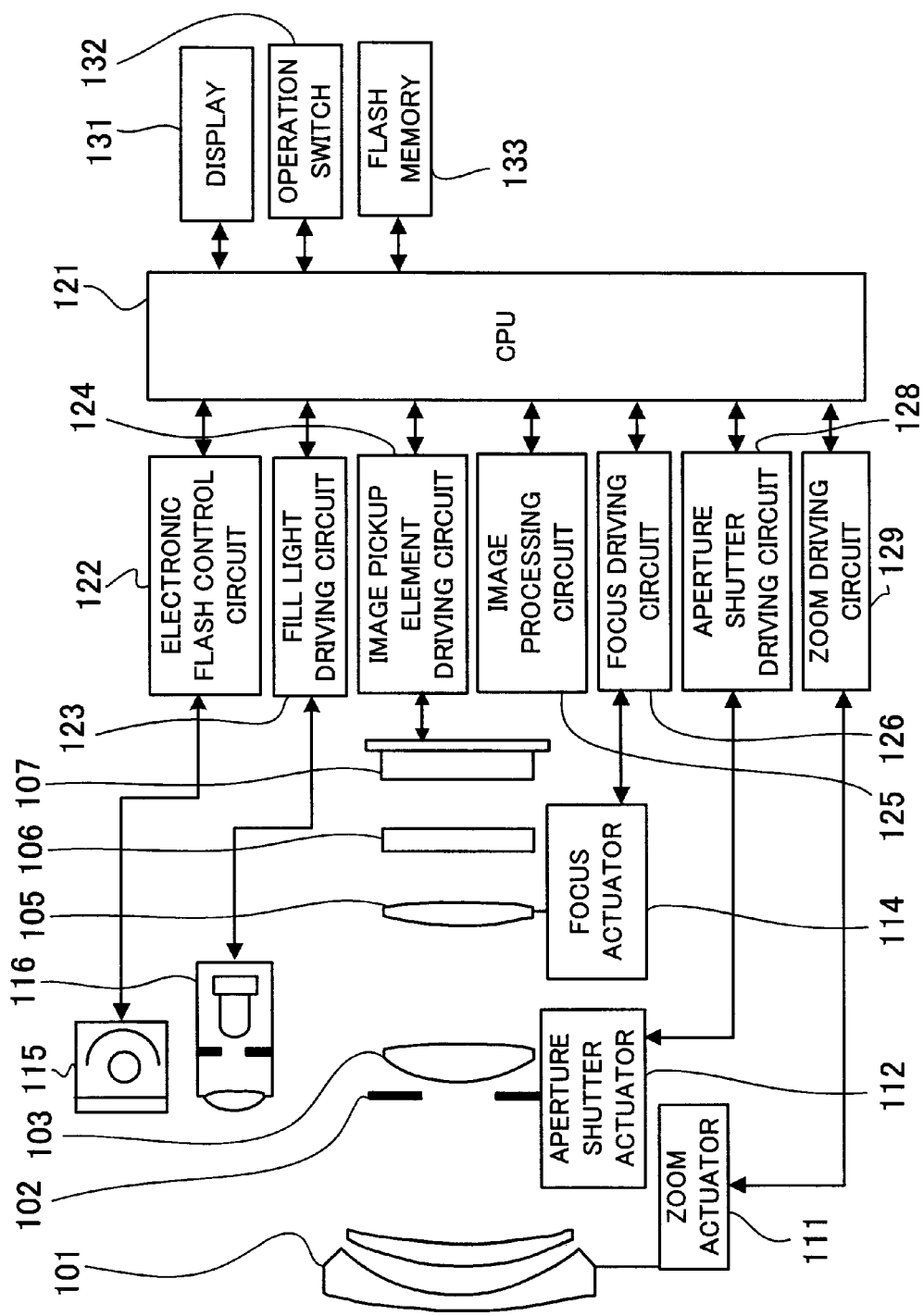
FIG. 1 is a block configuration diagram of an image pickup apparatus in the present embodiment.

Exemplary embodiments of the present invention will be described below with reference to the accompanied drawings. In each of the drawings, the same elements will be denoted by the same reference numerals and the duplicate descriptions thereof will be omitted.

First, a camera (an image pickup apparatus) in the present embodiment will be described. FIG. 1 is a block configuration diagram of a camera in the present embodiment. The camera of the present embodiment is an electronic camera which is constituted by integrally including a camera body having an image pickup element and an imaging lens. In FIG. 1, reference numeral 101 denotes a first lens group which is disposed at an end of an image pickup optical system (an imaging optical system), and is held so as to be movable backward and forward in an optical axis direction. Reference numeral 102 denotes a shutter with an aperture, and performs a light intensity adjustment during taking an image by adjusting its opening diameter. The shutter with the aperture 102 is also provided with a function as a shutter for adjusting an exposure time period during taking a still image. Reference numeral 103 denotes a second lens group. The shutter with the aperture 102 and the second lens group 103 are integrally movable backward and forward in the optical axis direction to perform a magnification varying operation (a zoom function) in cooperation with the movement of the first lens group 101 backward and forward. Reference numeral 105 denotes a third lens group, which moves backward and forward in the optical axis direction to perform focus operation. Reference numeral 106 denotes an optical low-pass filter, which is an optical element for reducing a false color or a moire of an image. The first lens group 101, the shutter with the aperture 102, the second lens group 103, the third lens group 105, and the optical element 106 constitute the image pickup optical system.

Reference numeral 107 denotes an image pickup element which is constituted by a C-MOS sensor and its peripheral circuit. As the image pickup element 107, for example a two-dimensional single plate color sensor where a primary color mosaic filter having a Bayer array is formed as an on-chip element on a light receiving pixel having m pixels in a horizontal direction and n pixels in a vertical direction is used. The image pickup element 107, as described below, includes a plurality of imaging pixels which performs a photoelectric conversion of an image formed by a light beam obtained from the image pickup optical system and a plurality of focus detection pixels which performs a photoelectric conversion of an image formed by a divided light beam of a light beam obtained from the image pickup optical system. In addition, the image pickup element 107 reads out a signal for which the photoelectric conversion has been performed in a predetermined direction (a first direction).

Reference numeral 111 denotes a zoom actuator, which drives the first lens group 101 or the third lens group 103 backward and forward in the optical axis direction by rotating a cam barrel (not shown) to perform and magnification varying operation. Reference numeral 112 denotes an aperture shutter actuator, which controls the opening diameter of the shutter with the aperture 102 to adjust an imaging light intensity and also performs an exposure time period control during taking a still image. Reference numeral 114 denotes a focus actuator, which drives the third lens group 105 backward and forward in the optical axis direction to perform a focus operation.

Reference numeral 115 denotes an object illuminating electronic flash which is operable during taking an image, and a flash illumination device using a xenon tube is preferably used, but an illumination device including an LED which continuously emits light may also be used. Reference numeral 116 denotes an AF fill light device, which projects an image of a mask including a predetermined opening pattern onto an object via a floodlight lens to improve the focus detection ability with respect to a dark object or a low-contrast object.

Reference numeral 121 denotes a CPU, which performs a various kind of controls of the camera body. The CPU 121 includes a calculator, a ROM, a RAM, an A/D converter, a D/A converter, a communication interface circuit, and the like. The CPU 121 drives each kind of circuits of the camera to perform a series of operations such as AF, taking an image, image processing, recording, and the like, based on a predetermined program stored in the ROM.

Reference numeral 122 denotes an electronic flash control circuit, which controls the lighting-up of an illumination device 115 in synchronization with the imaging operation. Reference numeral 123 denotes a fill light driving circuit, which controls the lighting-up of the AF fill light device 116 in synchronization with the focus detection operation. Reference numeral 124 denotes an image pickup element driving circuit, which controls the imaging operation of the image pickup element 107 and performs an A/D conversion of the obtained image signal to send it to the CPU 121. Reference numeral 125 denotes an image processing circuit, which performs processings such as a gamma conversion, a color interpolation, and a JPEG compression of the image obtained by the image pickup element 107.

Reference numeral 126 denotes a focus driving circuit, which performs a drive control of the focus actuator 114 based on the focus detection result and drives the third lens group 105 in the optical axis direction backward and forward to perform a focus operation. Reference numeral 128 denotes an aperture shutter driving circuit, which performs a drive control of the aperture shutter actuator 112 to control the opening of the shutter with the aperture 102. Reference numeral 129 denotes a zoom driving circuit, which drives the zoom actuator 111 in accordance with a zoom operation by a user.

Reference numeral 131 denotes a display (a monitor) such as LCD, which displays information relating to an imaging mode of the camera, a preview image before taking an image and the image for confirmation after taking the image, a display image in an in-focus state, and the like. Reference numeral 132 denotes an operation switch group, which is constituted by a power source switch, a release (an imaging trigger) switch, a zoom operation switch, an imaging mode selecting switch, and the like. Reference numeral 133 denotes a removable flash memory, which records the image.

Figure 2:
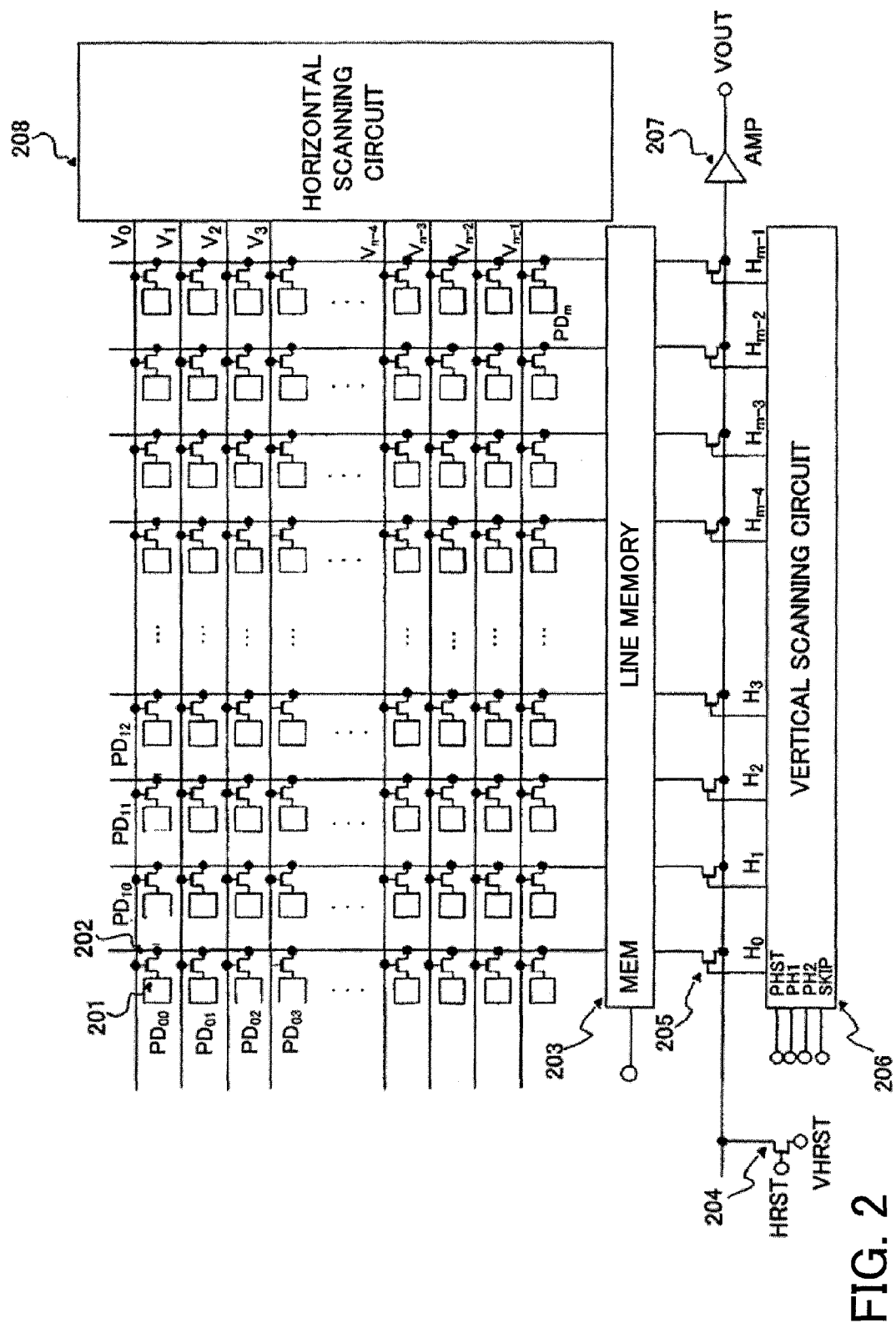
FIG. 2 is a block diagram of an image pickup element in the present embodiment.

FIG. 2 is a block diagram of the image pickup element 107 in the present embodiment. FIG. 2 shows only a configuration needed for explaining the read-out operation as described below, and a pixel reset signal and the like are omitted from FIG. 2. In FIG. 2, reference numeral 201 denotes a photoelectric converter (hereinafter, referred to as $PD_{mn}$, where m is an X-direction address and m=0, 1, . . . , m−1, and n is a Y-direction address and n=0, 1, . . . , n−1). The photoelectric converter $PD_{mn}$ is constituted by a photodiode, a pixel amplifier, a reset switch, and the like. The image pickup element 107 of the present embodiment includes the m×n photoelectric converters 201 which are two-dimensionally arranged. The symbol is added only to the top-left photoelectric converter $PD_{00}$ to avoid the complexity.

Reference numeral 202 denotes a switch of selecting an output of the photoelectric converter $PD_{mn}$, and the output is selected every row by a vertical scanning circuit 208 described below. Reference numeral 203 denotes a line memory for temporarily storing the output of the photoelectric converter $PD_{mn}$. The line memory 203 stores the output of the photoelectric converter $PD_{mn}$ every row selected by the vertical scanning circuit 208. Commonly, a capacitor is used as the line memory 203.

Reference numeral 204 denotes a switch which is connected with a horizontal output line and is used for resetting the horizontal output line to a predetermined potential VHRT, and is controlled by a signal HRT. Reference numeral 205 denotes a switch for sequentially outputting the output of the photoelectric converter $PD_{mn}$ stored in the line memory 203 to the horizontal output line, and the switches $H_0$ to $H_{m-1}$ are sequentially scanned by a horizontal scanning circuit 206 described below to read out the output of the photoelectric conversion every row.

Reference numeral 206 denotes a horizontal scanning circuit, which sequentially scans the output of the photoelectric converter $PD_{mn}$ stored in the line memory 203 to output to the horizontal output line. The signal PHST is a data input of the horizontal scanning circuit 206, and PH1 and PH2 are shift clock inputs. The data is set at PH1=H, and is latched at PH2, and the shift clock is inputted to the PH1 and PH2 to sequentially shift PHST to be able to sequentially turn on the switches $H_0$ to $H_{m-1}$. SKIP is a control terminal input set during the partial reading as described below. The SKIP terminal is set to H level to be able to skip the horizontal scanning circuit 206 at a predetermined time period. The reading operation will be described below in detail.

Reference numeral 208 denotes a vertical scanning circuit, and sequentially performs a scanning to output $V_0$ to $V_{n-1}$ to be able to select the select switch 202 of the photoelectric converter $PD_{mn}$. The control signal is, similarly to that of the horizontal scanning circuit 206, controlled by a data input PVST, shift clocks PV1 and PV2, and a partial read setting SKIP. These operations are the same as those of the horizontal scanning circuit 206, and descriptions thereof are omitted. The control signal is not shown in FIG. 2.

Figure 3A:
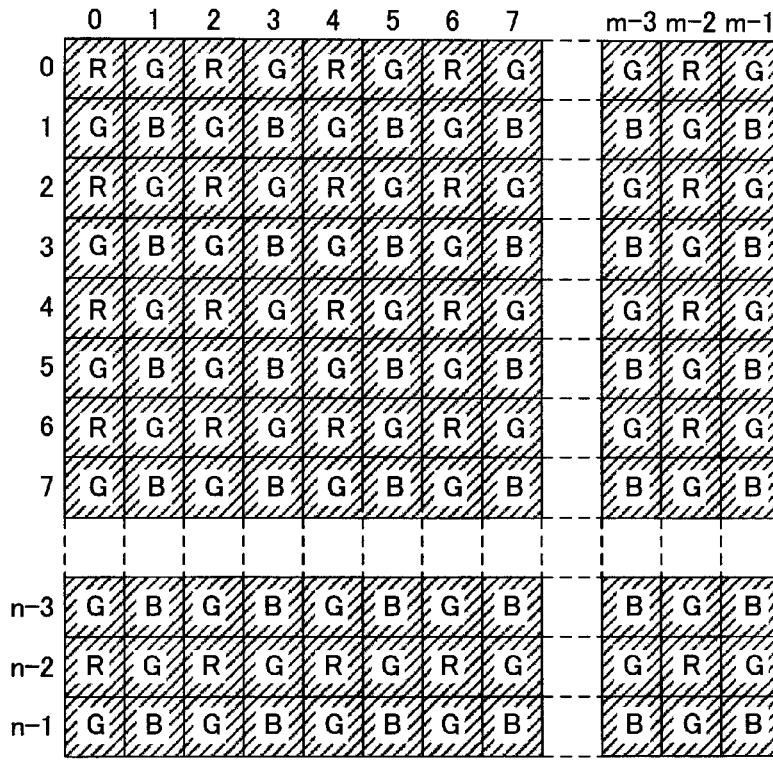
FIG. 3A is an explanatory diagram showing a case where all pixels of an image pickup element are read out in the present embodiment.
Figure 3B:
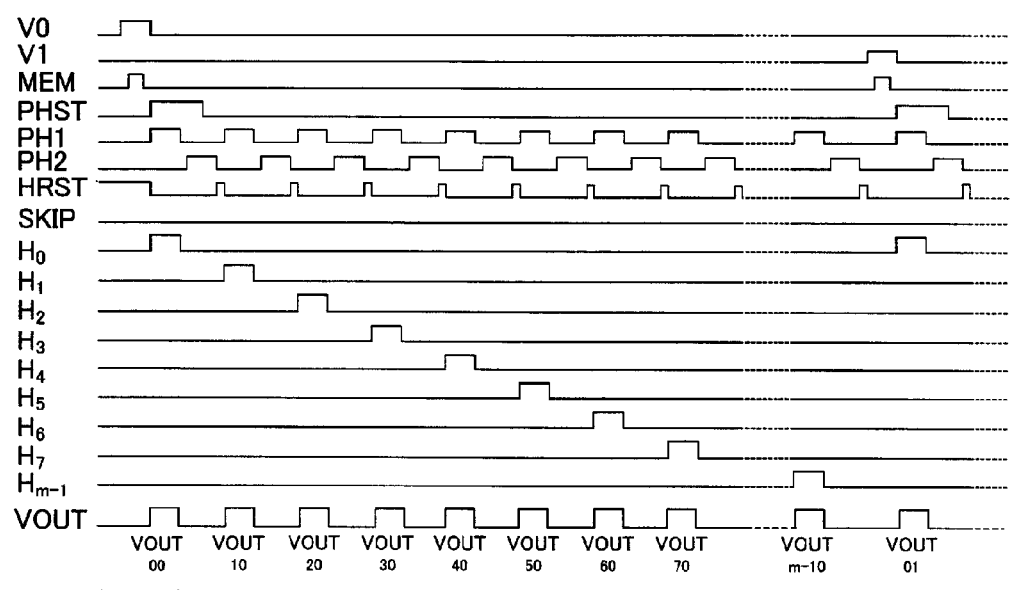
FIG. 3B is an explanatory diagram showing a case where all pixels of an image pickup element are read out in the present embodiment.

FIGS. 3A and 3B are explanatory diagrams showing a case where all pixels of the image pickup element in FIG. 2 are read out. FIG. 3A is an arrangement diagram of an m×n photoelectric converter. Each of the symbols R, G, and B shown in FIG. 3A represents a color filter applied to the photoelectric converter. In the present embodiment, among four pixels of two rows×two columns, the description is given by using a Bayer array where pixels having a spectral sensitivity of G (Green) for two diagonal pixels, and pixels having spectral sensitivities of R (Red) and B (Blue) respectively for the other two pixels are arranged. The numbers indicated at the upper and left sides in FIG. 3A are X and Y numbers, respectively. Pixel portions where hatched lines are drawn is to be read out (the hatched lines are drawn for all pixels because all pixels are to be read out). Commonly, a light-shielded OB (optical black) pixel which detects a black level and the like are also arranged in the image pickup element and the OB pixel is also read out, but description thereof is omitted.

FIG. 3B is a timing chart showing a case where data of all pixels of the image pickup element are read out. The CPU 121 controls the image pickup element driving circuit 124 to send a pulse to the image pickup element to control the reading of the data. Hereinafter, referring to FIG. 3B, the reading operation for all pixels will be described.

First, the vertical scanning circuit 208 is driven to activate $V_0$. At this time, each output of pixels at a zeroth row is outputted to the vertical output line. In this state, a MEM signal is activated and a sample holing of data of each pixel in the line memory portion is performed. Next, PHST is activated, the shift clocks of PH1 and PH2 are inputted, $H_0$ through $H_{m-1}$ are activated in order, and pixel outputs are outputted to the horizontal output line. The pixel output is outputted as VOUT via the amplifier 207, is converted into digital data by an AD converter (not shown), and a predetermined image processing is performed by the image processing circuit 125. Next, in the vertical scanning circuit, V1 is activated to output first pixel outputs to the vertical output line, and similarly the pixel outputs are temporarily stored in the line memory by the MEM signal. Next, similarly, PHST is activated to input the shift clocks of PH1 and PH2, $H_0$ through $H_{m-1}$ are activated in order, and pixel outputs are outputted to the horizontal output line. As described above, reading up to (n−1)th row is performed in order.

Figure 4A:
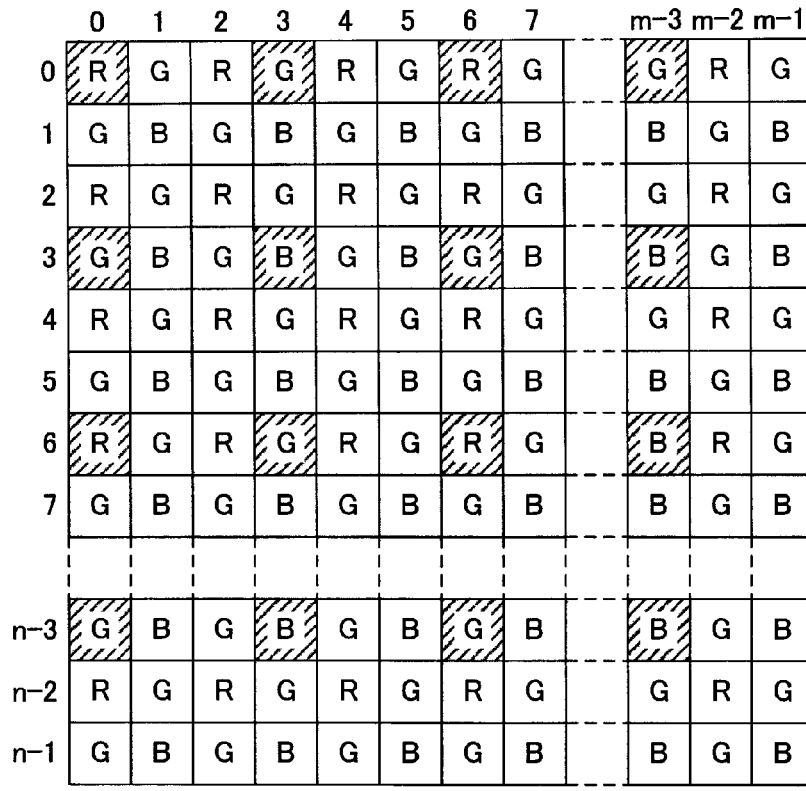
FIG. 4A is an explanatory diagram showing one example where partial pixels of an image pickup element are read out in the present embodiment.
Figure 4B:
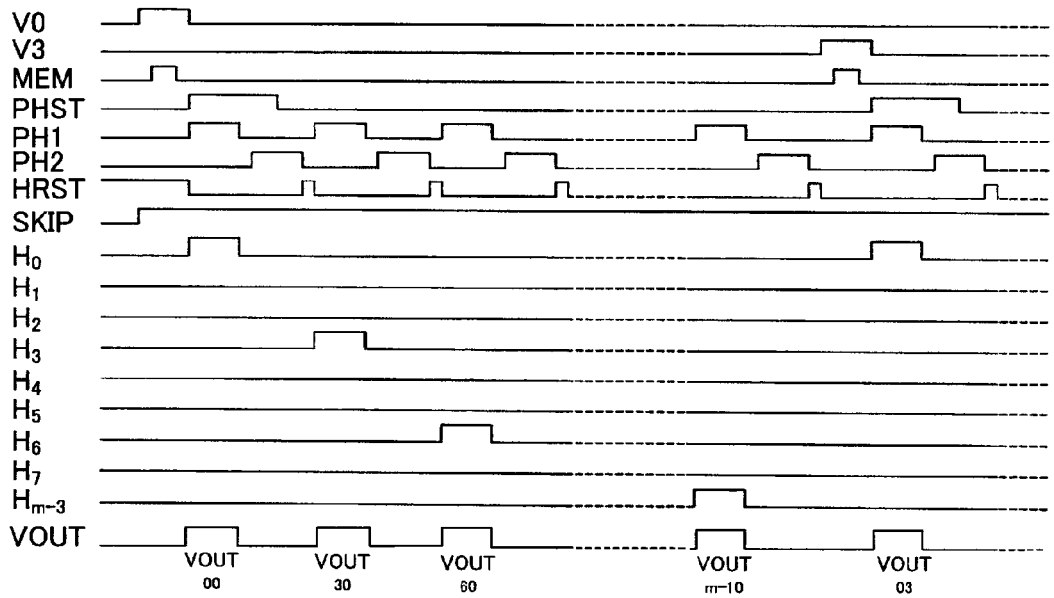
FIG. 4B is an explanatory diagram showing one example where partial pixels of an image pickup element are read out in the present embodiment.

FIGS. 4A and 4B are explanatory diagrams showing one example where partial pixels of the image pickup element in FIG. 2 are read out. FIG. 4A is an arrangement diagram of the m×n photoelectric converter, and shows the same image pickup element as that of FIG. 3A. The pixel portion where hatched lines are drawn is to be read out during the partial reading. In the embodiment, ⅓ partial reading is performed in both X and Y directions.

FIG. 4B is a timing chart of showing a case where a partial reading is performed. Referring to the timing chart of FIG. 4B, the operation of the partial reading will be described. The setting of the partial reading is performed by activating a control terminal of the horizontal scanning circuit 206 (shift register) and a SKIP terminal. The SKIP terminal is activated to change the operation of the horizontal scanning circuit 206 and the vertical scanning circuit 208 from the sequential scanning for every pixel to the sequential scanning for every three pixels. Specific description thereof is omitted because of the public domain.

In the partially reading operation, first, the vertical scanning circuit 208 is driven to activate $V_0$. At this time, each output of zeroth pixels is outputted to the vertical output line. In this state, the MEM signal is activated and the sample holing of data of each pixel in the line memory portion is performed. Next, PHST is activated to input the shift clocks of PH1 and PH2. At this time, the SKIP terminal is set to be active to change the path of the horizontal scanning circuit, and the pixel outputs are outputted to the horizontal output line every three pixels in order, like $H_0, H_3, H_6, \ldots, H_{m-3}$. The pixel output is outputted as VOUT via the amplifier 207, and it is converted by the AD converter (not shown) into digital data to perform a predetermined image processing by the image processing circuit 125. Next, the vertical scanning circuit 208, similarly to the horizontal scanning circuit 206, skips $V_1$ and $V_2$ and activates $V_3$ to output the third pixels to the vertical output line. Then, the pixel output is temporarily stored in the line memory by the MEM signal. Next, similarly, PHST is activated to input the shift clocks of PH1 and PH2, and H0, H3, H6, . . . , Hm−3 are, in order, activated to output the pixel output to the horizontal output line. Thus, the reading up to (n−3)th row is performed in order. As described above, ⅓ partial reading is performed in both horizontal and vertical directions.

Next, referring to FIGS. 5A, 5B, 6A, and 6B, the structures of the imaging pixel and the focus detection pixel of the image pickup element 107 will be described. In the present embodiment, a Bayer array where pixels having a spectral sensitivity of G (Green) for two diagonal pixels and pixels having spectral sensitivities of R (Red) and B (Blue) respectively for the other two pixels among four pixels of two rows×two columns are arranged is adopted. The focus detection pixels having a structure described below are discretely arranged by a predetermined regulation between the Bayer arrays.

Figure 5A:
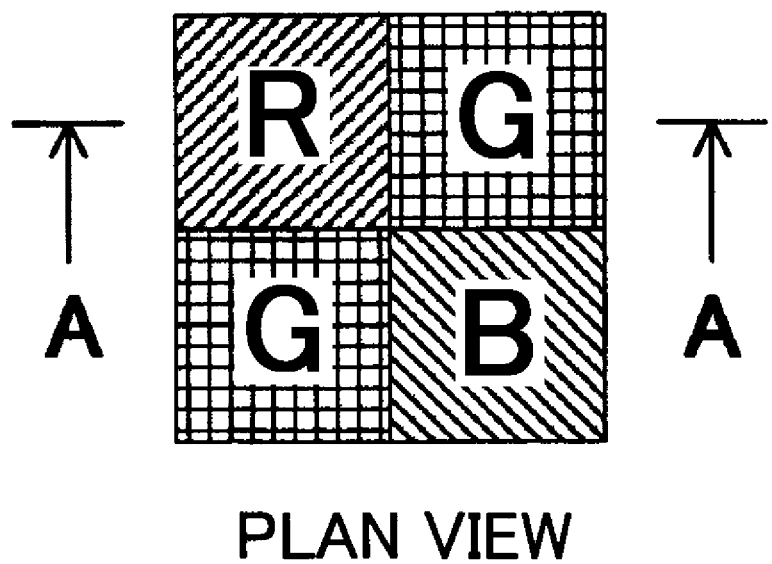
FIG. 5A is a plan view of imaging pixels in the present embodiment.
Figure 5B:
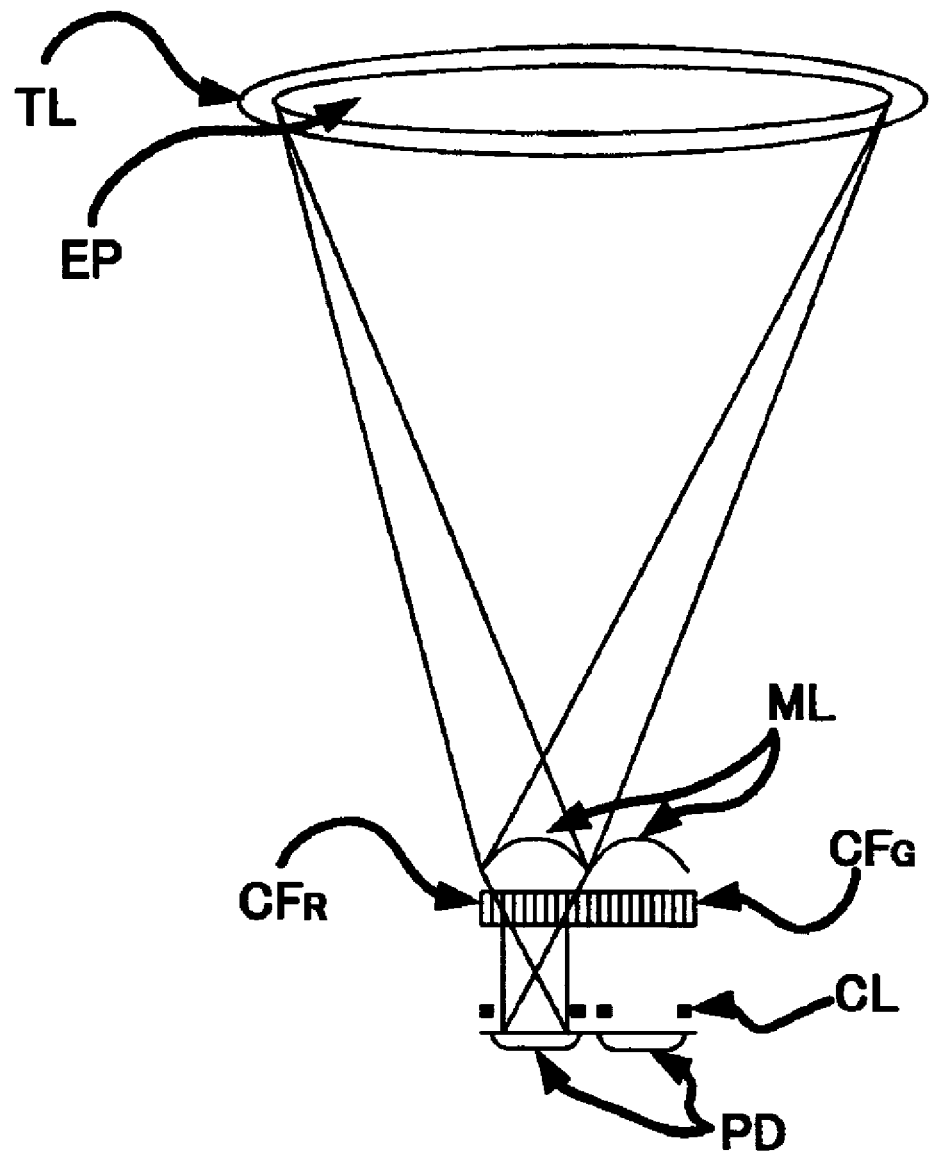
FIG. 5B is a cross-sectional view of imaging pixels in the present embodiment.

FIGS. 5A and 5B are a plan view and a cross-sectional view of the imaging pixels in the present embodiment. As shown in the plan view of the 2×2 imaging pixels of FIG. 5A, in the Bayer array, G pixels are arranged in a diagonal direction, and R and B pixels are arranged for the other two pixels. The 2×2 structure is repeatedly arranged.

FIG. 5B shows cross-section A-A of FIG. 5A. ML denotes an on-chip micro lens which is arranged at the forefront of each pixel, $CF_R$ denotes a color filter of R (Red), and $CF_G$ denotes a color filter of G (Green). PD schematically denotes the photoelectric converter of the C-MOS sensor described with reference to FIGS. 3A and 3B, and CL denotes a wire layer for forming a signal layer which transmits each kind of signals in the C-MOS sensor. TL schematically denotes the image pickup optical system.

The on-chip micro lens ML of the imaging pixel and the photoelectric converter PD are configured so as to introduce the light beam passing through the image pickup optical system TL. In other words, an exit pupil EP of the image pickup optical system TL and the photoelectric converter PD are in a conjugate relation by the micro lens ML, and an effective area of the photoelectric converter is designed to be a large area. In FIG. 5B, an incident light beam in the R pixel is described, and the G pixel and a B (Blue) pixel also have the same structure. Accordingly, the exit pupil EP corresponding to each of the imaging R, G, and, B pixels has a large diameter, and the light beam from an object is efficiently introduced to improve S/N of an image signal.

Figure 6A:
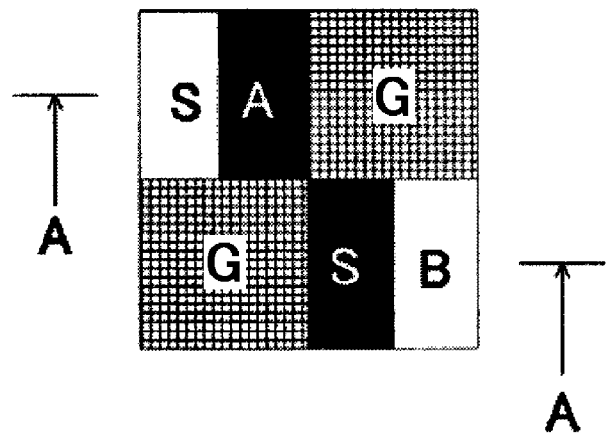
FIG. 6A is a plan view of focus detection pixels in the present embodiment.
Figure 6B:
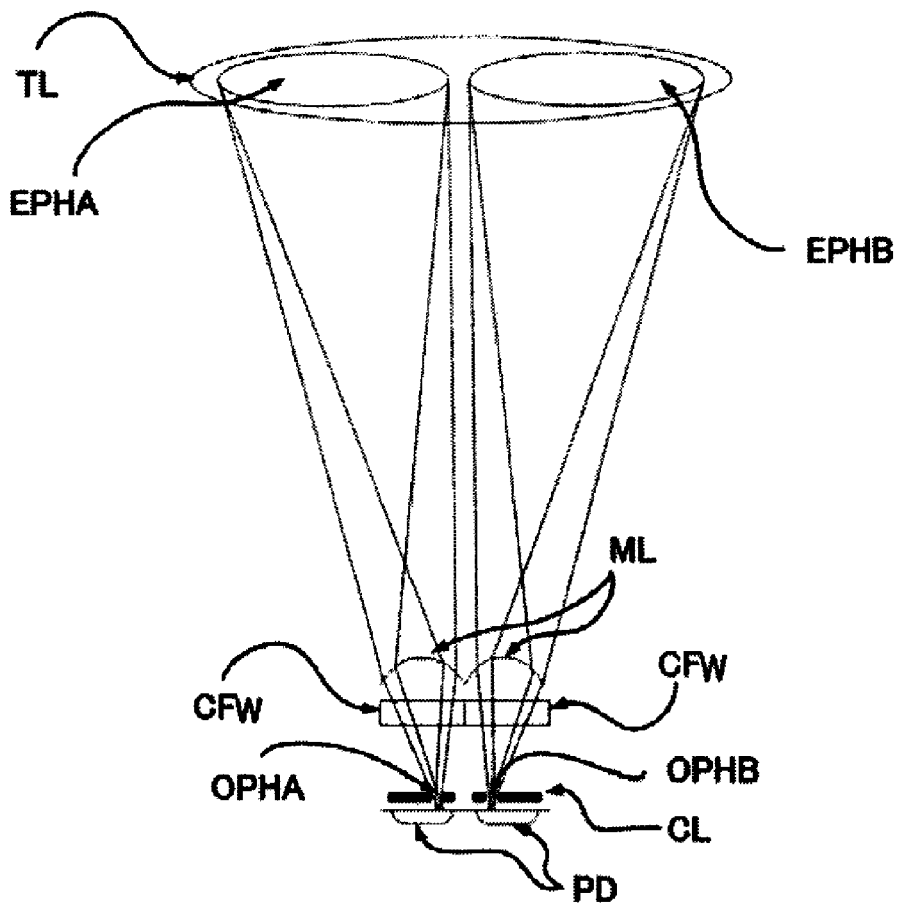
FIG. 6B is a cross-sectional view of focus detection pixels in the present embodiment.

FIGS. 6A and 6B are arrangement structure diagrams of the focus detection pixels for performing a pupil division in a horizontal direction (a lateral direction) of the imaging lens. FIG. 6A shows a plan view of pixels of 2 rows×2 columns including the focus detection pixels. When an imaging signal is obtained, the G pixel constitutes a main component of luminance information. Because a characteristic of image recognition by a human is sensitive to the luminance information, the image deterioration is easily recognized if the G pixels include a defect. On the other hand, the R pixel or the B pixel is a pixel which obtains color information, but a human is insensitive to the color information and the image deterioration is not easily recognized even if the pixels obtaining the color information includes some defects. Therefore, in the present embodiment, the G pixels of the 2×2 pixels remain as the imaging pixels and the R and B pixels of the 2×2 pixels are used as the focus detection pixels. These pixels are indicated by SA and SB respectively in FIG. 6A.

FIG. 6B shows a cross-section A-A of FIG. 6A. The micro lens ML and the photoelectric converter PD have the same structures as those in the imaging pixels shown in FIG. 5B. In the present embodiment, since the signal of the focus detection pixel is not used for generating an image, a transmissive film $CF_w$ (White) is arranged instead of the color filter for separating colors. In addition, since the pupil division is performed by the image pickup element, the opening of the wiring layer CL is displaced in one direction with respect to a center line of the micro lens ML. Specifically, since the pixel SA and its opening OPHA are displaced to the right side, a light beam passing through an exit pupil EPHA at the left side of the imaging lens TL is received. Similarly, since an opening OPHB of the pixel SB is displaced to the left side, a light beam passing through an exit pupil EPHB at the right side of the imaging lens TL is received. Therefore, the pixels SA are regularly arranged in a horizontal direction, and an object image obtained by these pixel groups is defined as an A image. The pixels SB are also regularly arranged in the horizontal direction. When the object image obtained by these pixel groups is defined as a B image, a defocus amount of the object image can be detected by detecting relative positions of the A image and the B image. If the defocus amount in a vertical direction (a longitudinal direction) is to be detected, the pixel SA and its opening OPHA may be displaced to the upper side and the pixel SB and its opening OPHB may be displaced to the lower side. If the defocus amount of the horizontal direction is to be detected, the pixels SA and SB may be rotated by 90 degrees to be displaced (not shown).

Figure 7A:
FIG. 7A is an arrangement of focus detection pixels for detecting a vertical line in the present embodiment.

FIG. 7A is an arrangement diagram of the imaging pixels and the focus detection pixels. FIG. 7A shows a partial (thinned) pixel arrangement, and the pixels are thinned so as to be ⅓ in an X (horizontal) direction and ⅓ in a Y (vertical) direction in the pixel arrangement. In FIG. 7A, G denotes a pixel to which a green filter is applied, R denotes a pixel to which a red filter is applied, and B denotes a pixel to which a blue filter is applied. Each of the G, R, and B pixels is a pixel in the partial reading. In FIG. 7A, pixels that are not read out in the partial reading are omitted. The pixel SA is a focus detection pixel which is formed by displacing an opening of a pixel portion in a horizontal direction, and constitutes a reference pixel group for detecting an image displacement amount in the horizontal direction with respect to the pixel SB described below. The pixel SB is a pixel formed by displacing its opening to a direction opposite to the opening of the pixel SA, and is a reference pixel group for detecting the image displacement amount in the horizontal direction with respect to the pixel SA. The hatched line portion of the pixels SA and SB indicates openings of the displaced pixels.

Because the focus detection pixels (pixels SA and SB) cannot be used for taking an image, they are configured so as to be discretely arranged at predetermined intervals in X and Y directions. In addition, it is preferable that the focus detection pixels are arranged at a portion other than the G pixel so that the image deterioration is not noticeable. In the present embodiment, a pair of pixels SA and SB is arranged in a block of 4×4 pixels (12×12 pixels of a pixel arrangement before the pixels are thinned) indicated by a bold black border in FIG. 7A. BLOCK_H(i,j) represents a block name. The block is configured so as to be completed by the 4×4 block.

With regard to the arrangement of the focus detection pixels, as shown in FIG. 7A, in blocks which are arranged at the same block in the X direction and are arranged at a different block in the Y direction, the arrangements of the pixels SA and SB are shifted by one pixel (shifted by three pixels before pixels are thinned). This arrangement is indicated by an arrow in FIG. 7A, and is used for improving sampling characteristics of the focus detection pixels discretely arranged. In other words, the pixels SA and SB are a pixel group for which a pupil division has been performed in the X (horizontal) direction, and therefore a shift amount in the X direction is one pixel unit so that the sampling is densified.

Figure 7B:
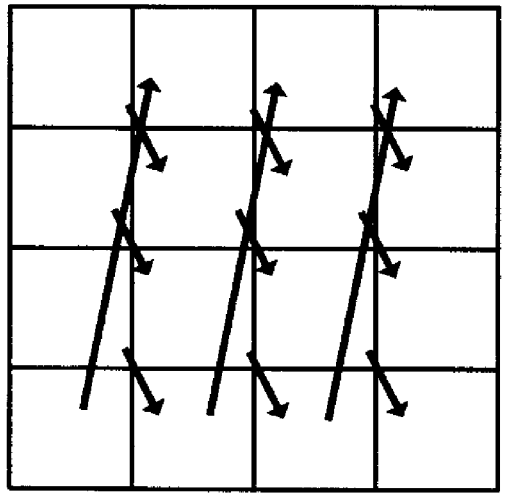
FIG. 7B is an arrangement of focus detection pixels for detecting a vertical line in the present embodiment.

FIG. 7B is a diagram showing an arrangement regulation between blocks. A portion indicated by a block border in FIG. 7B shows each block of BLOCK_H(i,j). As shown in FIG. 7B, in the block arranged different in the X direction, the shift is performed by one block unit in the Y direction. With regard to the Y direction that is not a focus detection direction, considering the deterioration of an image, the shift is performed by one block unit. In FIG. 7B, the regulation of the block shift is indicated by arrows. The enlargement to a whole image may be performed so as to be appropriately arranged by a 4×4 block unit at an arbitrary position of the image pickup element.

Figure 8A:
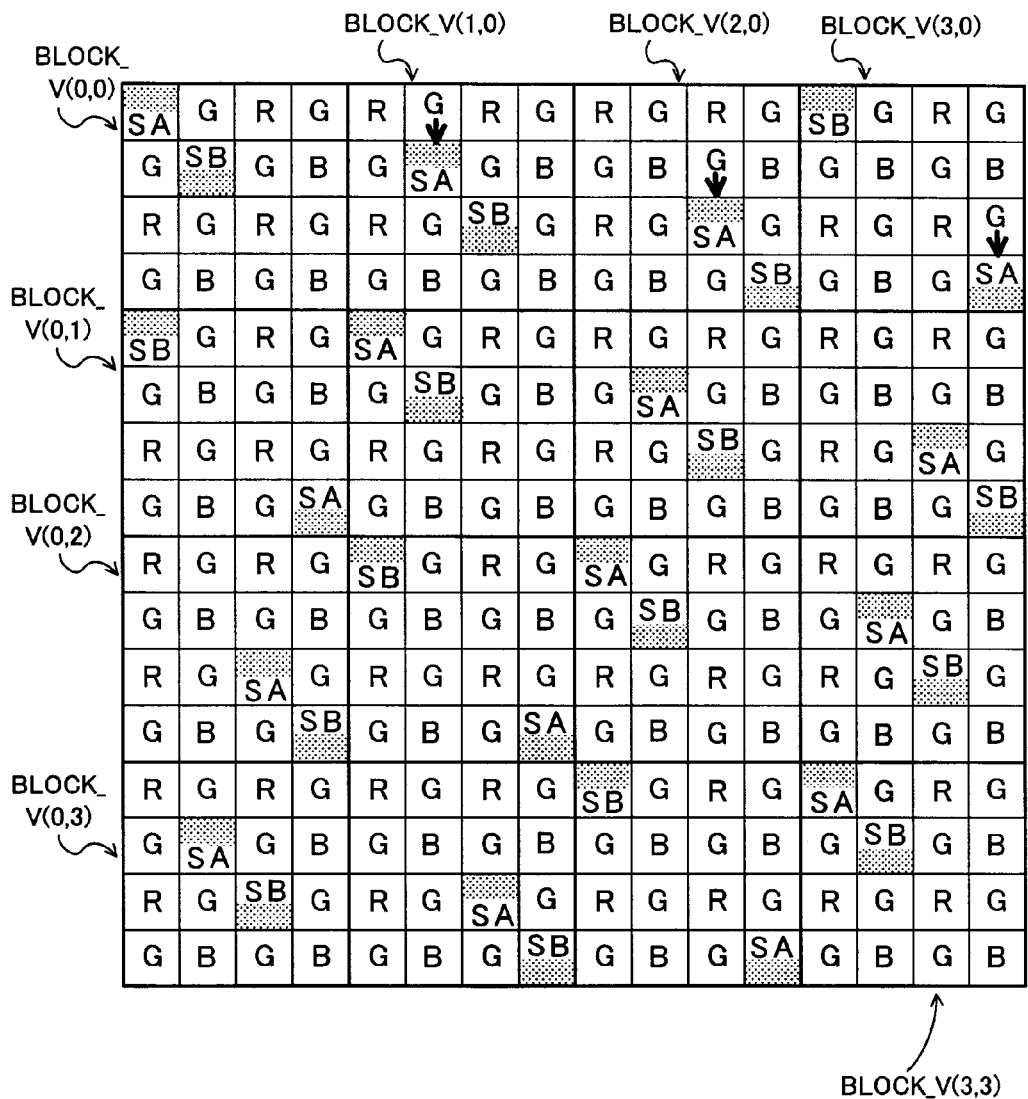
FIG. 8A is an arrangement of focus detection pixels for detecting a horizontal line in the present embodiment.
Figure 8B:
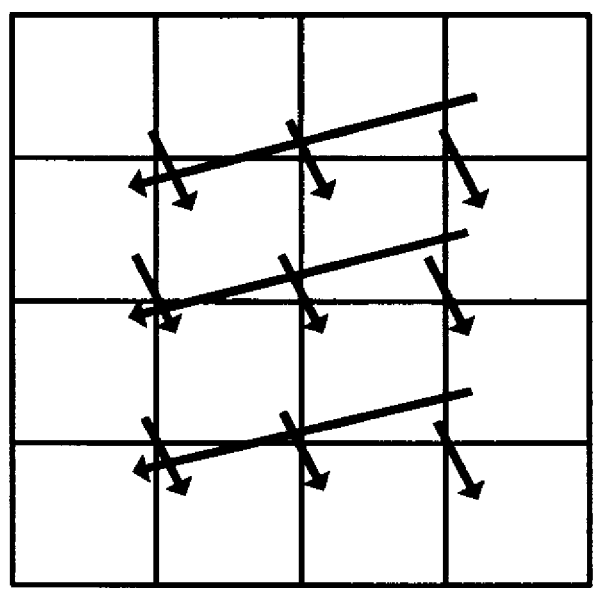
FIG. 8B is an arrangement of focus detection pixels for detecting a horizontal line in the present embodiment.

FIGS. 8A and 8B show configurations where the arrangements of FIGS. 7A and 7B are rotated by 90 degrees in accordance with the direction of the pupil division. The configurations other than that are the same as those of FIGS. 7A and 7B, and therefore descriptions thereof are omitted. In FIG. 8A, pixels that are not read out in the partial reading are omitted.

Figure 9A:
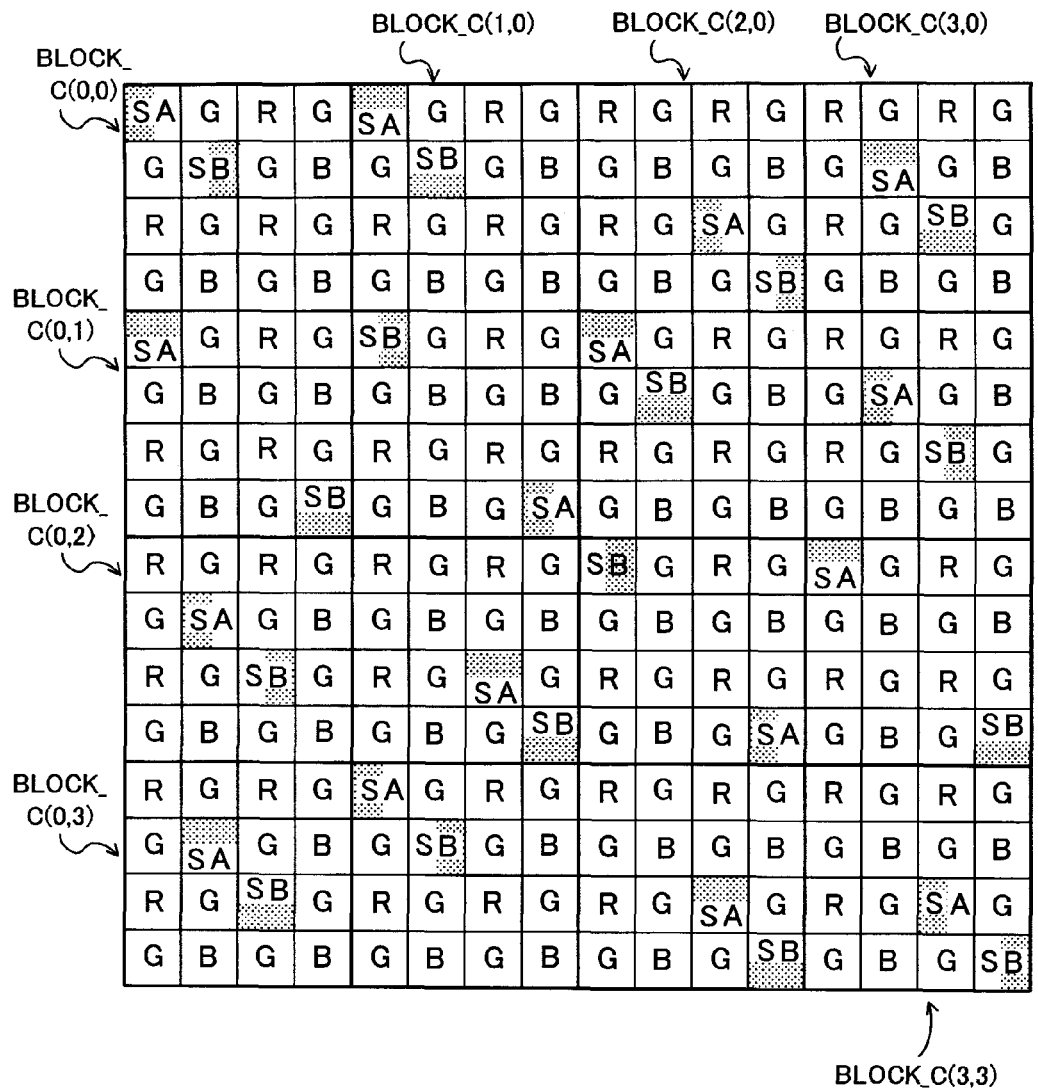
FIG. 9A is an arrangement of focus detection pixels for detecting vertical and horizontal lines in the present embodiment.

FIGS. 9A and 9B show configurations where image displacement amounts in horizontal and vertical directions in FIGS. 7A, 7B, 8A, and 8B can be detected in the same detection field of view, and BLOCK_H(i,j) and BLOCK_V (i,j) are checked in a nested arrangement. FIG. 9A shows a detail arrangement where pixel portions are described. When the nested arrangement is constituted by using 4×4 blocks of the horizontal and vertical detections, patterns are completed by 8×8 blocks. However, for avoiding the complexity of the drawing, only the 4×4 blocks are shown. The block name in the nested arrangement is represented by BLOCK_C(i,j). In FIG. 9A, pixels that are not read out in the partial reading are omitted.

FIG. 9B shows BLOCK_H(i,j) and BlOCK_V(i,j) which correspond to BLOCK_C(i,j) shown in FIG. 9A so as to be able to recognize a correspondence relation of the nested arrangement. Referring to FIG. 9A, the regularity of the nested arrangement is clear.

Figure 10A:
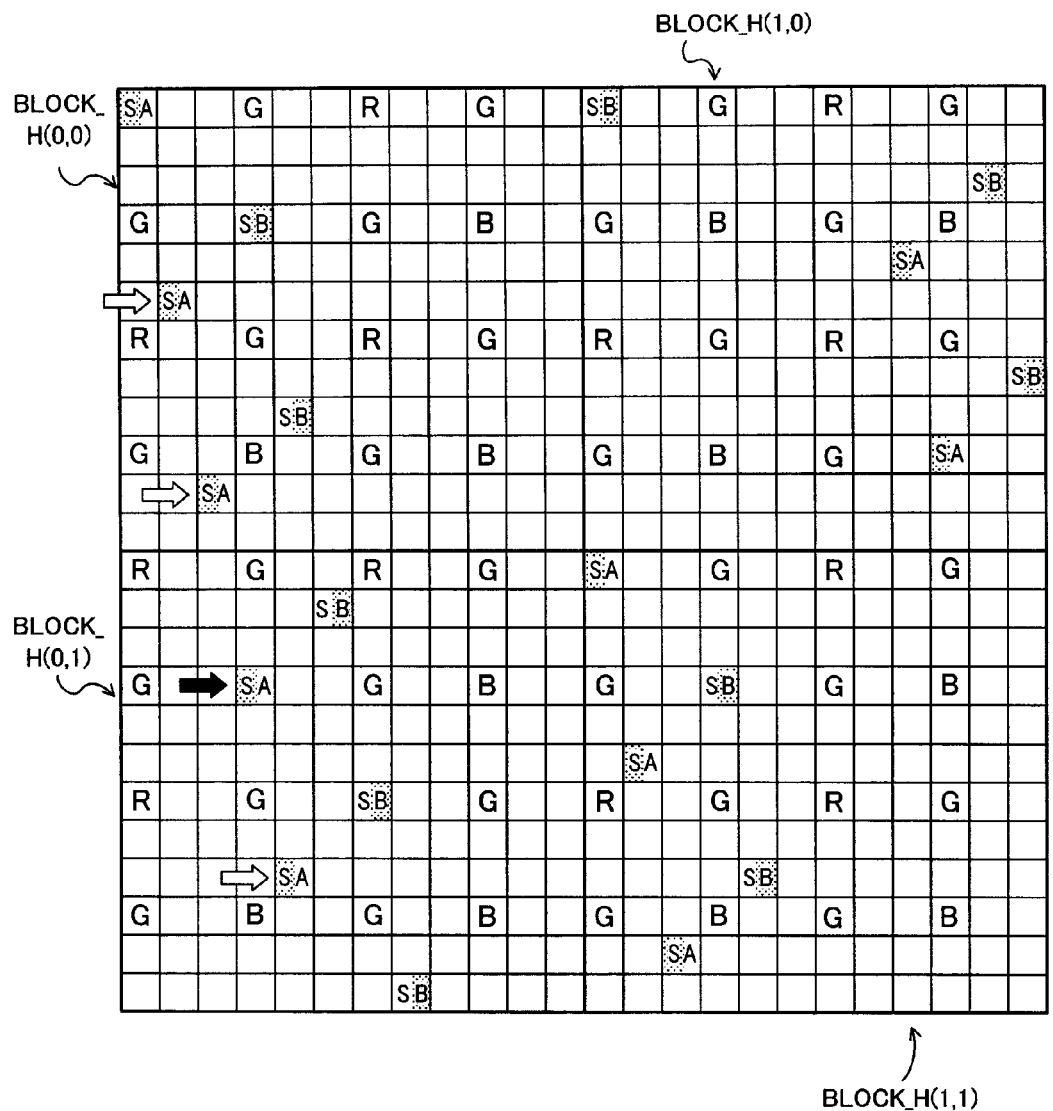
FIG. 10A is an arrangement of focus detection pixels for detecting a vertical line in the present embodiment.

FIG. 10A shows an arrangement of the focus detection pixels for detecting a horizontal line corresponding to a case where a part of the image screen is clipped to be read out, like an enlargement mode of an electronic view finder and a digital zoom of a video. It is based on the arrangement of FIG. 7A. Similarly to FIG. 7A, BLOCK_H(i,j) represents a block name. The block is constituted so as to be completed by 4×4 blocks, but, for avoiding the complexity of the drawing, only 2×2 blocks are shown. In the enlargement operation and the digital zoom operation, a mode in which a part of the imaging area is partially read out is adopted, but all pixels are read without performing the partial reading for pixels in a part of areas. Accordingly, in such a case, the arrangement of the pixels SA and SB in the pixels which are not read out in the partial reading mode can improve the focus detection accuracy.

White background pixels where any symbol is not described in FIG. 10A represent pixels which are not read out in the partial reading, and the pixels are also read to be enlarged in the enlargement operation and the digital zoom operation. With regard to the arrangement of the focus detection pixel, as shown in FIG. 10A, in blocks which are at the same positions in the X direction and are at different positions in the Y direction, the arrangement of the pixels SA and SB is shifted by one pixel so that the sampling pitch is finer in reading all pixels. The pixel SA indicated by a white background arrow in FIG. 10A is a pixel which is complementarily arranged so as to improve the sampling in reading all pixels. It complements the pixel SA indicated by a black arrow read out in reading the partial pixels to minimize the sampling pitch.

The sampling in the Y direction is, similarly to the arrangements of FIGS. 7A, 7B, 8A, and 8B, discretely arranged compared with the case of the X direction to prevent the image deterioration.

Figure 10B:
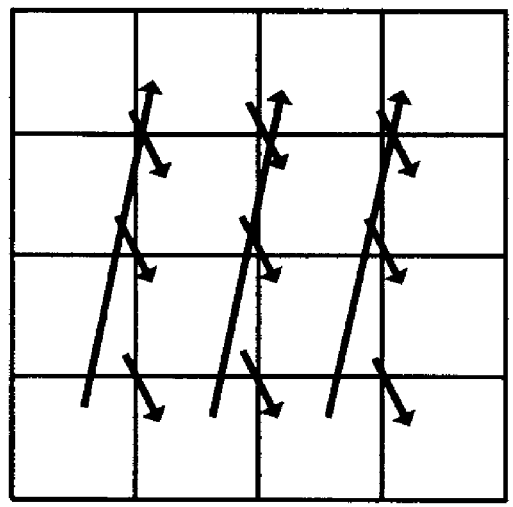
FIG. 10B is an arrangement of focus detection pixels for detecting a vertical line in the present embodiment.

FIG. 10B shows an arrangement regulation for each block of FIG. 10A, and the arrangement regulation is the same as that of FIG. 7B. When horizontal line detection is performed in the pixel arrangement of the horizontal detection of FIGS.

8A and 8B, similarly to FIGS. 10A and 10B, it is preferable that the pixels SA and SB are complementarily arranged at the pixel portion which is not read out in the partial reading. Since the arrangement regulation is clear from the relationship between the FIGS. 7A and 7B and FIGS. 10A and 10B, detail descriptions thereof are omitted. Since the cross arrangements of the vertical and horizontal lines can also be configured similarly to FIGS. 9A and 9B, descriptions thereof are omitted.

In a system configured as described above, referring to FIG. 12, an operation flow of a live view mode in the present embodiment will be described. First, in Step S101, when the live view mode starts, each live view control parameter is initialized to start a control for the live view operation. This control is for example performed in accordance with a control program stored in a storage portion of the CPU 121.

Figure 11:
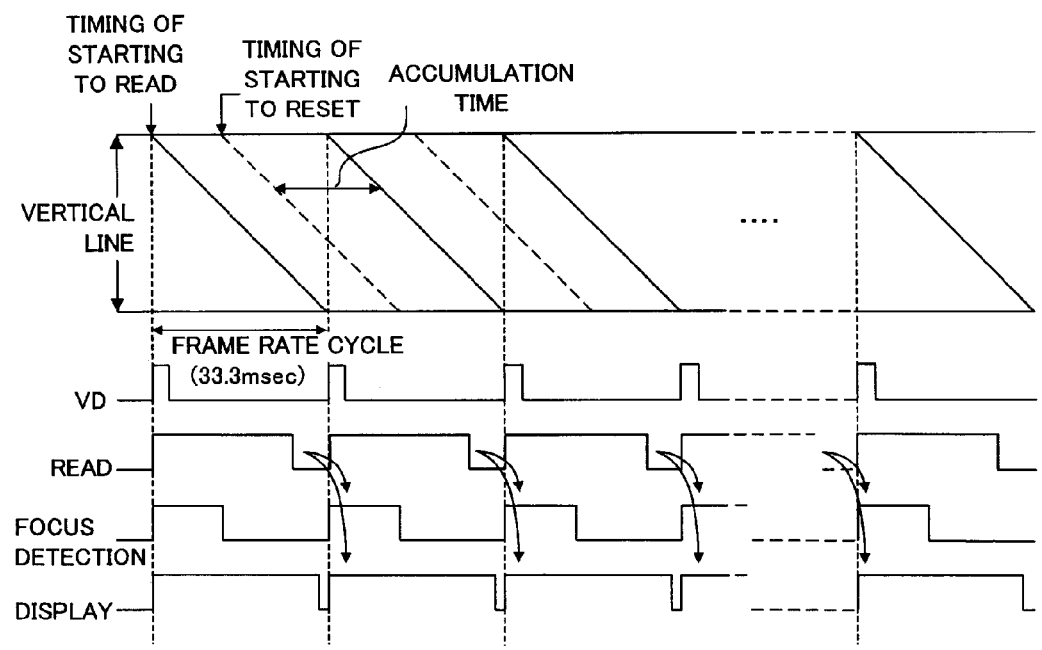
FIG. 11 is a timing chart explaining an outline of an imaging operation sequence during a live view mode in the present embodiment.

Next, the live view operation will be described. FIG. 11 is a timing chart describing an outline of an imaging operation sequence during the live view operation in the present embodiment. As shown in FIG. 11, the image pickup element 107 reads out an accumulated charge of each pixel in the image pickup element 107 as an image signal after the exposure operation is performed. The reading operation is performed in synchronization with a control pulse vertical synchronous signal VD and a control pulse horizontal synchronous signal HD (not shown). The control pulse vertical synchronous signal VD is a signal representing one frame of the imaging. In the present embodiment, a command is received from the CPU 121 for example every 1/30 second (accordingly, a video recording of 30 frames in one second is performed in the present embodiment) to be sent from the image pickup element driving circuit 124 to the image pickup element 107. The control pulse horizontal synchronous signal HD is a horizontal synchronous signal of the image pickup element 107, and the number of pulses depending on the number of lines of the horizontal lines during a time period of one frame is sent at predetermined intervals to control the horizontal line. In synchronization with the control pulse horizontal synchronous signal HD, the pixel is reset for each horizontal line so as to be a set accumulated time (indicated by dotted line in FIG. 11). Since the above technology is in the public domain, more detailed descriptions are omitted.

When the accumulation reading is performed by the control pulse vertical synchronous signal VD and the control pulse horizontal synchronous signal HD, the control pulse vertical signal VD is sent to start the accumulation operation of the subsequent frame. The read image signal is transferred to the image processing circuit 125 to perform an image processing such as a defect pixel correction or the like. In the image pickup element 107 of the present embodiment, a pupil division function is given to a part of the pixel group (focus detection pixel) to be able to perform a so-called phase difference AF. The focus detection pixel is also regarded as a defect pixel to perform the defect correction, and the signal is transferred to the image processing circuit and a display circuit.

In order to pick up data of the focus detection pixels included in image data to detect a focus state of the imaging lens, the image signal is also transferred to a phase difference detection block (not shown) in the image processing circuit 125 (focus detector). The circuit block performs a correlation calculation of the pixels SA and SB for which pupil division has been performed to calculate a phase difference AF evaluated value. The image processing circuit 125 is capable of performing a focus detection of the image pickup optical system using a phase difference between at least a pair of images in a predetermined direction (a first direction) and a pair of images in a second direction different from the first direction, based on an output of the focus detection pixels (pixels SA and SB). The first direction is a direction where the signal for which photoelectric conversion has been performed by the image pickup element 107. Thus, the CPU 121 controls the focus driving circuit 126 to operate the focus actuator 114 to perform a focus operation of the imaging lens.

A photometric detector which is constituted by the image processing circuit 125 and the CPU 121 performs a photometry to determine exposure conditions such as an accumulation time, a gain, and an aperture value. The CPU 121 operates the aperture shutter actuator 112 based on the determined aperture value to drive the aperture.

Figure 12:
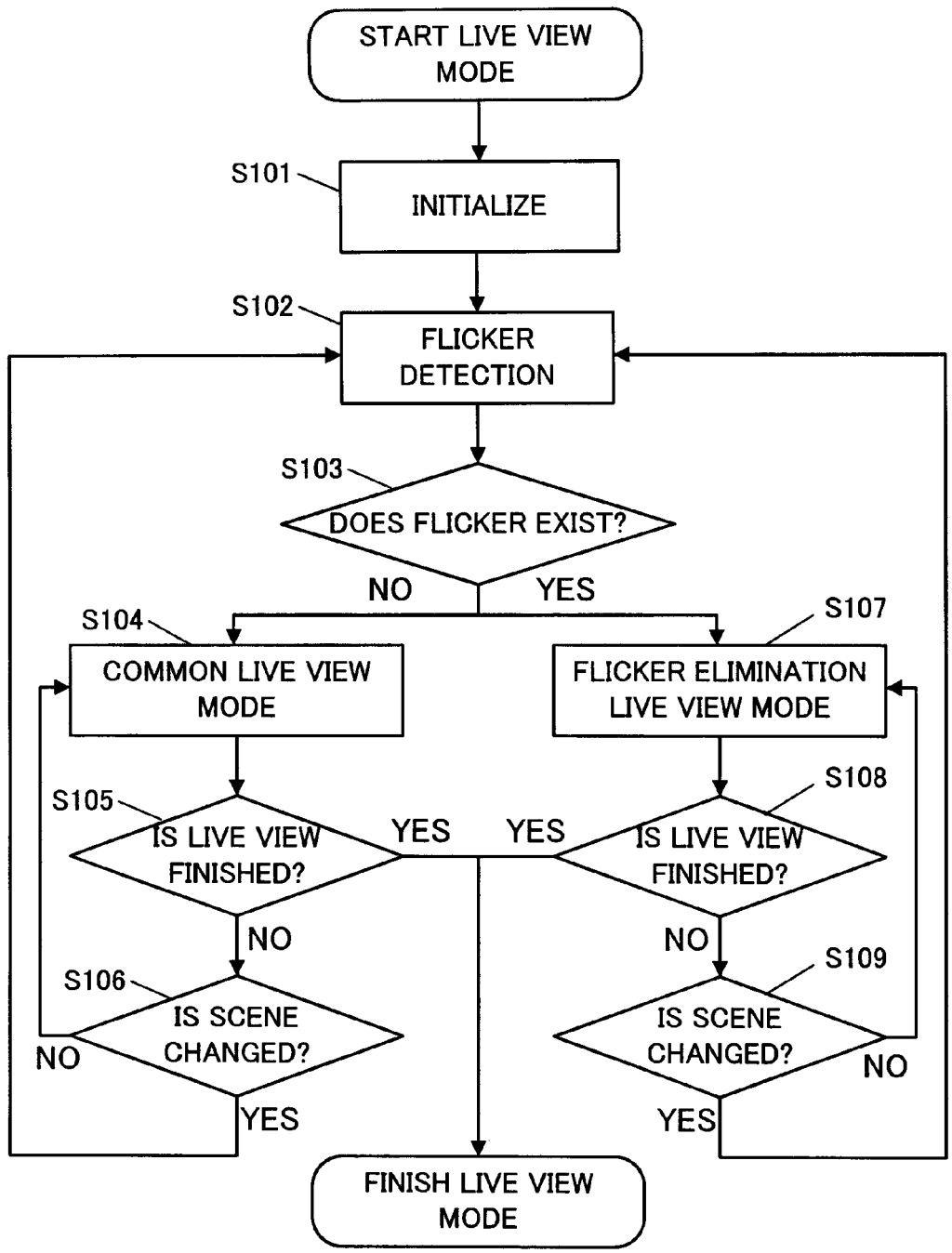
FIG. 12 is an operation flow of a live view mode in the present embodiment.
Figure 13:
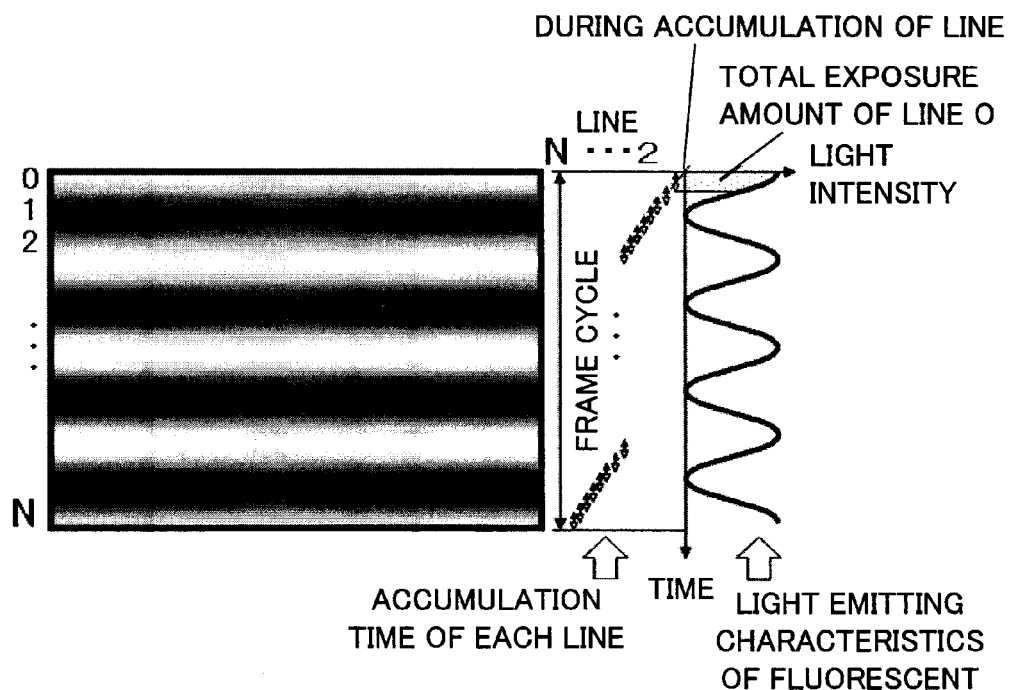
FIG. 13 is a diagram showing a relationship between a luminescence cycle of a fluorescent and a signal of each line of an image pickup element in the present embodiment.

In Step S102 of FIG. 12, flicker detection is performed by the CPU 121 that is a flicker detector. Referring to FIG. 13, a flicker detection method in the present embodiment will be described. FIG. 13 is a diagram showing a relationship between a luminescence cycle of a fluorescent and a signal of each line of the image pickup element. In the embodiment, the light intensity of the fluorescent varies at predetermined cycle, and an accumulation timing of the pixel of the image pickup element is different from each line. In this case, a strip flicker (a line flicker) as shown in FIG. 13 is generated in a signal read out of the image pickup element depending on the light intensity of the fluorescent at the accumulation timing of each line. Since the interval of the strips corresponds to the flicker cycle of the fluorescent, the flicker cycle can be obtained by calculating the interval of the strips.

Figure 14:
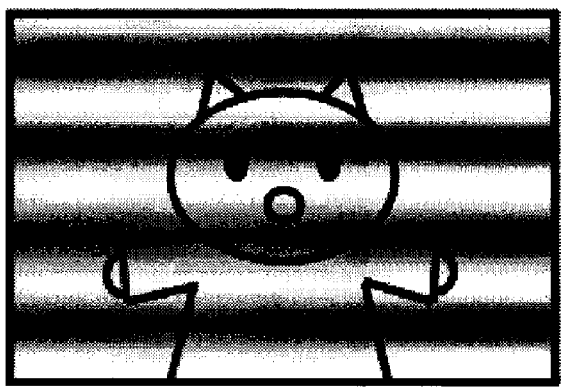
FIG. 14 is images A and B in which phases of strips generated by a line flicker are different by 180 degrees from each other with respect to an identical object in the present embodiment.
Figure 14:
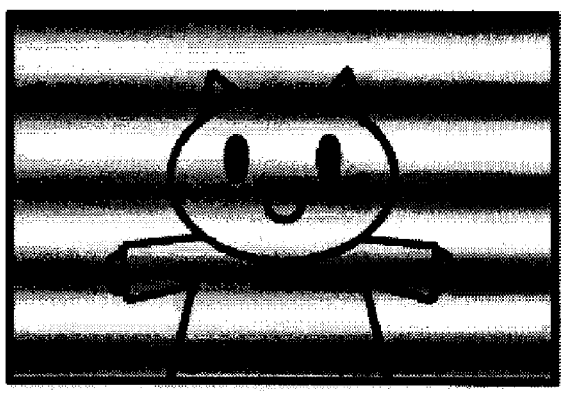

Specifically, a horizontal projection of the image signal shown in FIG. 13 is obtained to calculate its cycle. However, since there are various kinds of reflectances in a real object in a screen, the horizontal projection of the image signal shown in FIG. 13 is also influenced by the reflectances of the object. Therefore, as shown in FIG. 14 for example, two images A and B where the identical object is included and the phases of the strips of the line flicker are different by 180 degrees from each other are considered. In this case, if the horizontal projections Ah and Bh are calculated for each of the images A and B to calculate a value Ah/Bh obtained by dividing the horizontal projection Ah by the horizontal projection Bh, the influence of the reflectances of the object can be prevented to obtain a signal in which only a flicker component is contained. In the embodiment, since the frequency of the commercial power source is 50 Hz or 60 Hz, the phases of the strips of the line flicker of two sequential image signals are different by 180 degrees from each other in either frequency when the signal is read out at a frame rate of for example 22.2 fps.

Figure 15A:
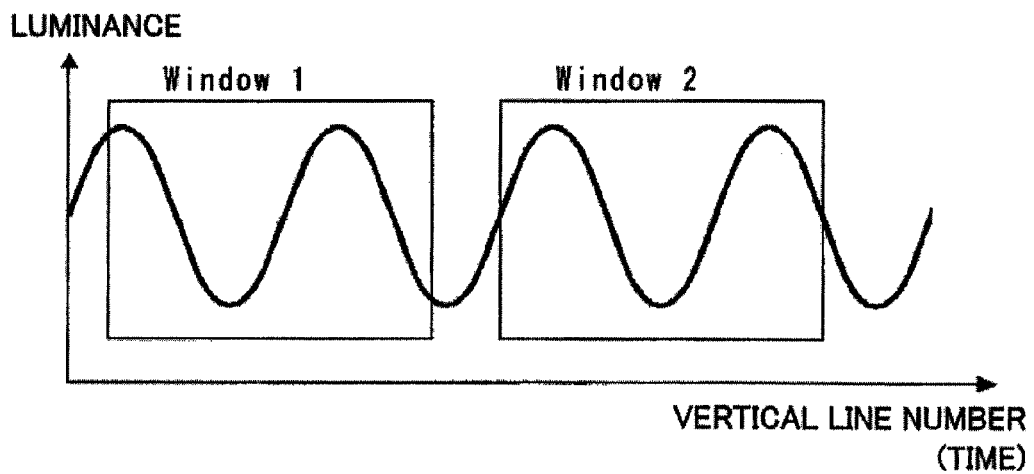
FIG. 15A is a waveform diagram of a value Ah/Bh obtained by dividing a horizontal projection Ah of an image A by a horizontal projection Bh of an image B in the present embodiment.
Figure 15B:
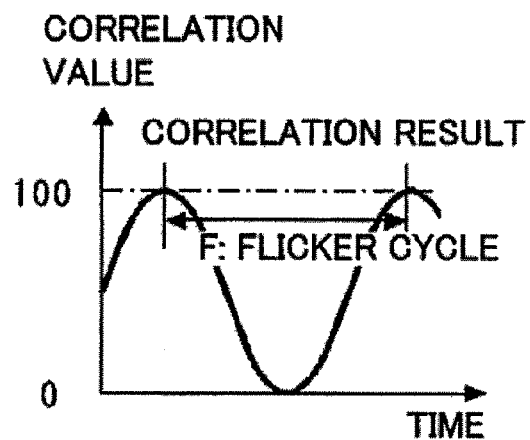
FIG. 15B is a waveform diagram of a value Ah/Bh obtained by dividing a horizontal projection Ah of an image A by a horizontal projection Bh of an image B in the present embodiment.

In the waveform of the value Ah/Bh shown in FIG. 15A, the horizontal axis indicates the number of vertical lines, and a time is obtained by multiplying it by a scanning time of one horizontal line. If the amplitude of the waveform of FIG. 15A is greater than a predetermined value, the existence of the flicker can be confirmed. However, in order to prevent a false detection caused by illuminance unevenness in a screen, the following processing is performed. In other words, as shown in FIG. 15A, two windows (Window 1 and Window 2) are set in the waveform to calculate a self correlation of the waveform in both windows. Thus, the waveform of the correlation result as shown in FIG. 15B can be obtained. In the embodiment, on condition that the waveform of Window 2 is being displaced with respect to the waveform of Window 1, the correlation of a case where PEAK of the waveform of Window 1 is overlapped with PEAK of the waveform of Window 2 is 100. On the other hand, the correlation of a case where PEAK of the waveform of Window 1 is overlapped with BOTTOM of the waveform of Window 2 is 0. The cycle of the waveform of the correlation result shown in FIG. 15B is defined as a flicker cycle. When the flicker does not exist, the amplitude of the waveform of FIG. 15B is reduced. Therefore, when a correlation threshold value is set to a predetermined value and PEAK of the waveform of FIG. 15B is equal to or greater than the correlation threshold value or BOTTOM is equal to or less than the correlation threshold value, it is determined that the flicker exists. On the other hand, if not, it is determined that the flicker does not exist. As above, existence or nonexistence of the flicker of the object and the flicker cycle if the flicker exists can be detected. However, a few frames are necessary to detect the flicker cycle.

Next, in Step S103 of FIG. 12, based on the flicker detection result in Step S102, one live view mode is selected from a plurality of live view modes by a live view mode selecting portion (CPU 121). In the present embodiment, the live view displaying portion (CPU 121), as described below, sequentially displays a signal read out of the image pickup element 107 on a display 131 by either one of a first live view mode or a second live view mode. In Step S102, when the CPU 121 determines that the flicker does not exist, the flow proceeds to Step S104. On the other hand, the CPU 121 determines that the flicker exists, the flow proceeds to Step S107.

In Step S104, a common live view mode (a first live view mode) in which a live view operation is performed at a predetermined reading time is selected by the live view mode selecting portion (the CPU 121). In the first live view mode, a program diagram having a characteristic of a superior focusing confirmation is selected and the aperture is preferentially selected to be opened to determine exposure control parameters such as an accumulation time, a gain, and an aperture value.

On the other hand, in Step S107, a flicker elimination live view mode (a second live view mode) which reduces the influence of the flicker to perform the live view operation is selected by the live view mode selecting portion. In the second live view mode, based on the flicker detection result in Step S102, an exposure control parameters are determined by a program diagram where an accumulation time of the integral multiple of the flicker cycle is preferentially selected. The flicker elimination live view mode is performed by reducing the flicker by the flicker reduction portion (CPU 121). Thus, the flicker reduction portion operates so that the flicker is reduced based on the detection result of the flicker detector (CPU 121). Therefore, the image signal which is not influenced by the flicker can be read out.

Figure 16A:
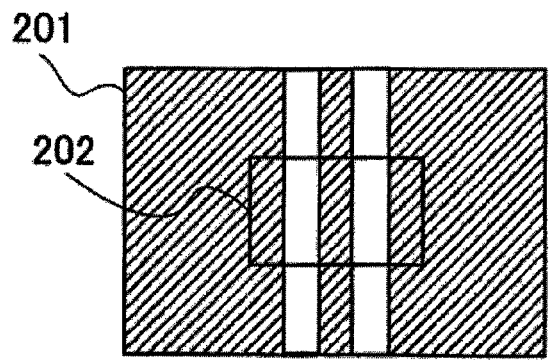
FIG. 16A is a diagram showing an object imaged in a field angle area of an image pickup element in the present embodiment.
Figure 16E:
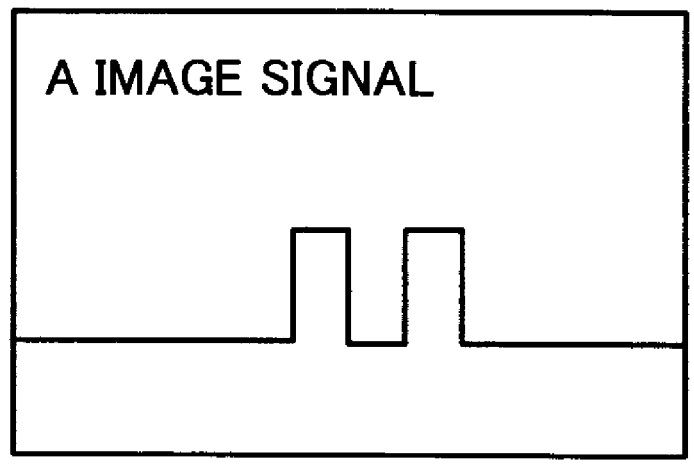
FIG. 16E is a diagram showing an A image signal of an object imaged in a field angle area of an image pickup element in the present embodiment.
Figure 16F:
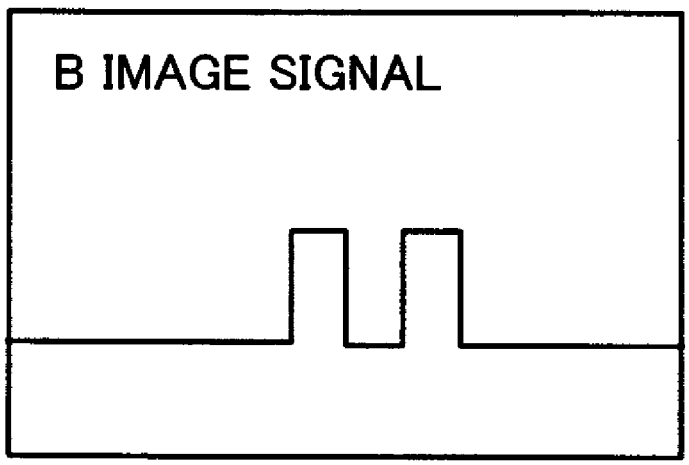
FIG. 16F is a diagram showing a B image signal of an object imaged in a field angle area of an image pickup element in the present embodiment.

Next, the focus detection method in the present embodiment will be described. The image pickup element 107 of the present embodiment is provided with a pupil division function capable of detecting an image displacement amount in horizontal and vertical directions for a part of the pixel groups and is configured to be able to perform a so-called phase difference AF. Data of the focus detection pixels included in the image data are picked up every horizontal and vertical directions and the data is transferred to a phase difference detection block (not shown) in the image processing circuit 125 to calculate the phase difference AF evaluated value. Next, the image signal transferred by the pixels SA and SB in which a pupil division has been performed will be described with reference to FIGS. 16A to 16F. In FIG. 16A, reference numeral 201 denotes an object which is imaged on a field angle area of the image pickup element 107 and shows two bar charts capable of detecting the image displacement in the horizontal direction. Reference numeral 202 denotes a focus detection frame. In this case, the image signals transferred from the focus detection pixels which detect the image displacement in the horizontal direction to the phase difference detection block are an A image signal and a B image signal as shown in FIGS. 16B and 16C if the focus state of the lens is in an in-focus state. The correlation amount of the A image signal and the B image signal is calculated to be able to detect the focus state. In FIG. 16D, reference numeral 203 denotes an object which is imaged on a field angle area of the image pickup element 107 and shows two bar charts capable of detecting the image displacement in the vertical direction. Reference numeral 204 denotes a focus detection frame. In this case, the image signals transferred from the focus detection pixels which detect the image displacement in the vertical direction to the phase difference detection block are an A image signal and a B image signal as shown in FIGS. 16E and 16F if the focus state of the lens is in an in-focus state. The correlation amount of the A image signal and the B image signal is calculated to be able to detect the focus state.

In Steps S104 and S107, the influence of the flicker does not exist in the image signal read out of the image pickup element 107. Therefore, as described above, the image displacement amount in the horizontal and vertical directions can be accurately detected. Accordingly, the reliability of the same level is given to the image displacement amounts in the horizontal and vertical directions to be able to perform a lens drive by selecting one of them or synthesizing them.

Figure 17A:
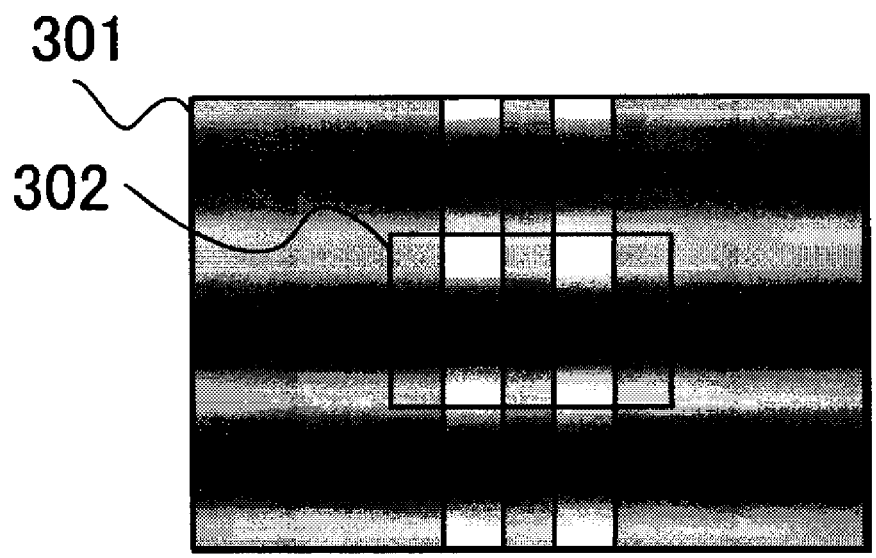
FIG. 17A is a diagram showing an object imaged in a field angle area of an image pickup element in the present embodiment.
Figure 17B:
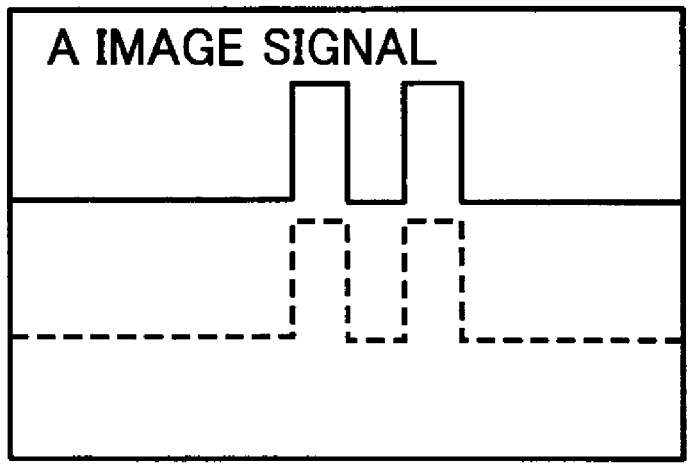
FIG. 17B is a diagram showing an A image signal of an object imaged in a field angle area of an image pickup element in the present embodiment.
Figure 17C:
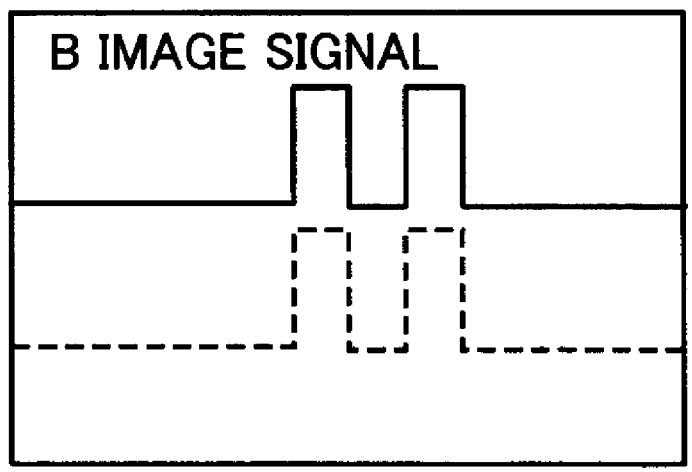
FIG. 17C is a diagram showing a B image signal of an object imaged in a field angle area of an image pickup element in the present embodiment.

On the other hand, in Steps S101 to S103, because the live view operation is not performed based on the flicker detection result, the image signal read out of the image pickup element 107 is influenced by the flicker. In this case, the image signals transferred to the phase difference detection block of the image processing circuit 125 by the pixels SA and SB in which a pupil division has been performed will be described with reference to FIGS. 17A to 17F. In FIG. 17A, reference numeral 301 denotes an object which is imaged on a field angle area of the image pickup element 107, and shows two bar charts capable of detecting an image displacement in a horizontal direction. Reference numeral 302 denotes a focus detection frame. In FIG. 17A, horizontal strips show an illuminance unevenness caused by the influence of the flicker. In this case, if the focus state of the lens is in an in-focus state, the image signals transferred from the focus detection pixels which detect the image displacement in the horizontal direction to the phase difference detection block are an A image signal and a B image signal as shown in FIGS. 17B and 17C, and the image signals are shifted by the influence of the flicker. In FIGS. 17B and 17C, a dotted line indicates each signal where the flicker does not exist. However, when the correlation amount in the horizontal direction is calculated, the influence of the flicker given to the A image signal and the B image signal does not cause an error and therefore the focus state can be accurately detected.

Figure 17D:
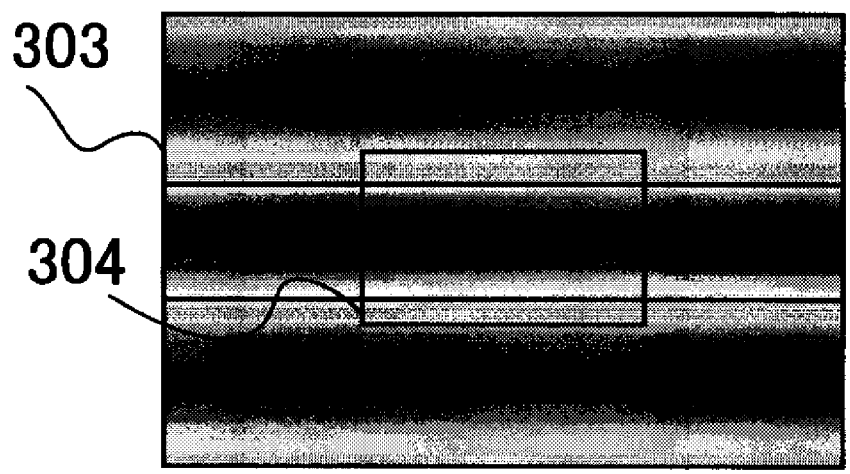
FIG. 17D is a diagram showing an object imaged in a field angle area of an image pickup element in the present embodiment.
Figure 17E:
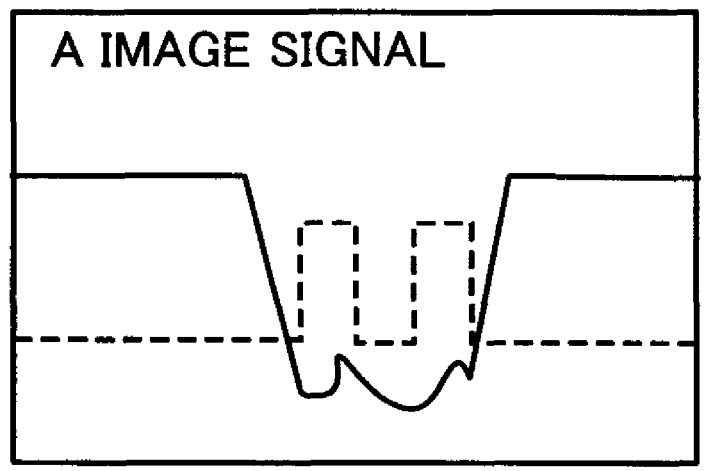
FIG. 17E is a diagram showing an A image signal of an object imaged in a field angle area of an image pickup element in the present embodiment.
Figure 17F:
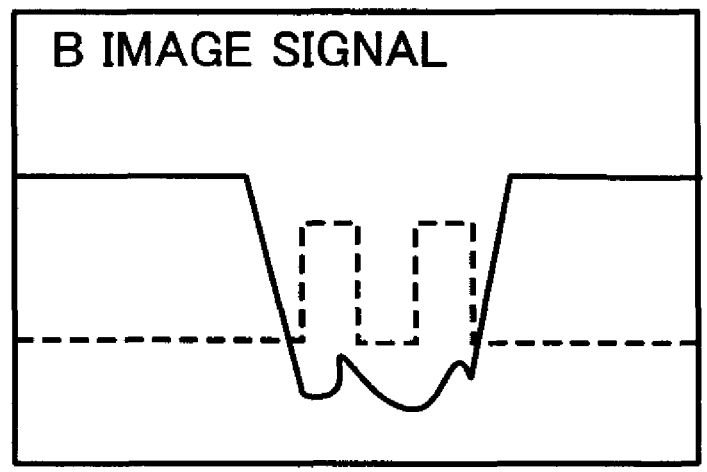
FIG. 17F is a diagram showing a B image signal of an object imaged in a field angle area of an image pickup element in the present embodiment.

In FIG. 17D, reference numeral 303 denotes an object which is imaged on a field angle area of the image pickup element 107, and shows two bar charts capable of detecting an image displacement in a vertical direction. Reference numeral 304 denotes a focus detection frame. In FIG. 17D, horizontal strips show an illuminance unevenness caused by the influence of the flicker. In this case, if the focus state of the lens is in an in-focus state, the image signals transferred from the focus detection pixels which detect the image displacement in the vertical direction to the phase difference detection block are an A image signal and a B image signal as shown in FIGS. 17E and 17F. The A image signal and the B image signal are influenced by the flicker, and a desired image signal of the object cannot be obtained. Therefore, the correlation amount cannot be accurately calculated based on the A image signal and the B image signal. Accordingly, the reliability of the image displacement amount in the vertical direction is decreased and the lens is driven by selecting one of the signals or synthesizing the signals.

For example, in the present embodiment, the CPU 121 changes methods of processing the focus detection between before and after selecting the live view mode (before and after performing the operation of the flicker reduction portion). Specifically, the focus detector performs, based on an instruction of the CPU 121, a focus detection using an image displacement amount between the focus detection pixels which are arranged in a predetermined direction (a first direction) where the flicker is not influenced before selecting the live view mode (before performing the operation of the flicker reduction portion). Or the image displacement amount between the focus detection pixels arranged in this direction is preferentially used. On the other hand, the focus detector performs a focus detection using an image displacement amount between focus detection pixels arranged in a plurality of directions (first and second directions) after selecting the live view mode (after performing the operation of the flicker reduction portion). Thus, the CPU 121 is a controller that controls the focusing of the image pickup optical system in accordance with the focus state of the image pickup optical system obtained by a phase difference of a pair of images in the predetermined direction (the first direction).

In Step S105 of FIG. 12, the existence or nonexistence of the drive stopping signal of the live view is determined, and if the drive stopping signal is outputted, the live view drive is finished. On the other hand, if the drive stopping signal is not outputted, the flow proceeds to Step S106. In Step S106, the necessity of detecting the flicker, i.e. the existence or nonexistence of the change of scenes is determined again. When it is determined there is necessity of detecting the flicker, the flow proceeds to Step S102 to detect the flicker again. On the other hand, when it is determined there is no necessity of detecting the flicker, the flow proceeds to Step S104 to continue the common live view mode. The subsequent determination of the necessity of detecting the flicker is not necessary, but for example if the object luminance or the like changes, the flicker may also be detected again because a light source may be changed.

In Step S108, the existence or nonexistence of the drive stopping signal of the live view is determined. If the drive stopping signal is outputted, the live view drive is finished. On the other hand, if the drive stopping signal is not outputted, the flow proceeds to Step S109. In Step S109, the necessity of detecting the flicker, i.e. the existence or nonexistence of the change of scenes is determined again. When it is determined there is necessity of detecting the flicker, the flow proceeds to Step S102 to detect the flicker again. On the other hand, when it is determined there is no necessity of detecting the flicker, the flow proceeds to Step S107 to continue the flicker elimination live view mode.

As described above, depending on the existence or nonexistence of the influence of the flicker in the image signal transferred to the phase difference detection block, the focus detection is performed by changing the reliability in the image displacement detecting direction to perform accurate focus detection also in a case where the influence of the flicker exists. Therefore, compared with the case where the focus detection is performed after the flicker is detected and the influence of the flicker is eliminated, the responsive focus detection and AF can be performed.

The present embodiment provides a focus adjustment apparatus of an electronic camera including an image pickup element, and is especially useful for an electronic still camera or a movie camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

101 FIRST LENS GROUP
102 SHUTTER WITH APERTURE
103 SECOND LENS GROUP
105 THIRD LENS GROUP
106 OPTICAL LOW-PASS FILTER
107 IMAGE PICKUP ELEMENT
121 CPU
125 IMAGE PROCESSING CIRCUIT

The invention claimed is:

1. An image pickup apparatus comprising:
   an image pickup element having a plurality of imaging pixels configured to perform a photoelectric conversion of an image formed by a light beam from an image pickup optical system and a plurality of focus detection pixels configured to perform a photoelectric conversion of an image formed by divided light beams of the light beam from the image pickup optical system, wherein with respect to a signal for which a photoelectric conversion has been performed, the image pickup element is configured to read the signal in a first direction;
   a focus detector configured to detect a focus state of the image pickup optical system using a phase difference of a first pair of images in the first direction and a phase difference of a second pair of images in a second direction different from the first direction, based on outputs of the focus detecting pixels; and
   a flicker reduction portion configured to reduce flicker,
   wherein use of a phase difference of the second pair of images in the second direction for detecting a focus state is restricted before performing an operation of the flicker reduction portion.

2. An image pickup apparatus according to claim 1, further comprising a flicker detector configured to detect the flicker,
   wherein the flicker reduction portion is operable so as to reduce the flicker based on a detection result of the flicker detector.

3. An image pickup apparatus according to claim 1,
   wherein use of a phase difference of the second pair of images in the second direction for detecting a focus state is permitted after performing the operation of the flicker reduction portion.

4. A method of controlling an image pickup apparatus that includes an image pickup element having a plurality of imaging pixels configured to perform a photoelectric conversion of an image formed by a light beam from an image pickup optical system and a plurality of focus detection pixels configured to perform a photoelectric conversion of an image formed by divided light beams of the light beam from the image pickup optical system, wherein with respect to a signal for which a photoelectric conversion has been performed, the image pickup element is configured to read the signal in a first direction,
   wherein said method comprises:
   detecting a focus state of the image pickup optical system using a phase difference of a first pair of images in the first direction and a phase different of a second pair of images in a second direction different from the first direction, based on outputs of the focus detecting pixels; and reducing flicker, wherein use of a phase difference of the second pair of images in the second direction for detecting a focus state is restricted before the reducing step.

* * * * *